(12) United States Patent
Ryan et al.

(10) Patent No.: US 8,313,113 B2
(45) Date of Patent: Nov. 20, 2012

(54) HAND TRUCKS AND RELATED SHIPPING METHODS

(75) Inventors: Paul Ryan, Wichita, KS (US); Robert A. Wood, Lincoln, NE (US)

(73) Assignee: DG Manufacturing, LLC, Wichita, KS (US)

( * ) Notice: Subject to any disclaimer, the term of this patent is extended or adjusted under 35 U.S.C. 154(b) by 0 days.

(21) Appl. No.: 13/329,034

(22) Filed: Dec. 16, 2011

(65) Prior Publication Data

US 2012/0153584 A1 Jun. 21, 2012

Related U.S. Application Data

(60) Provisional application No. 61/424,053, filed on Dec. 16, 2010.

(51) Int. Cl.
*B62D 39/00* (2006.01)
(52) U.S. Cl. .............................. 280/33.991; 280/33.997
(58) Field of Classification Search ............ 280/33.991, 280/47.131, 47.17, 47.23, 47.26, 47.27
See application file for complete search history.

(56) References Cited

U.S. PATENT DOCUMENTS

| | | | | |
|---|---|---|---|---|
| 3,027,174 A | * | 3/1962 | Garbarino | 280/33.996 |
| 3,046,033 A | * | 7/1962 | Andersen et al. | 280/33.991 |
| 3,224,787 A | * | 12/1965 | Andersen | 280/33.991 |
| 3,276,786 A | * | 10/1966 | Olander | 280/33.997 |
| 3,346,271 A | * | 10/1967 | Parsons | 280/33.998 |
| 3,927,898 A | * | 12/1975 | Weyrauch | 280/47.27 |
| 4,325,561 A | * | 4/1982 | Lynn | 280/33.991 |
| 5,553,876 A | * | 9/1996 | Trubiano | 280/33.991 |
| 6,203,029 B1 | * | 3/2001 | Ondrasik | 280/33.991 |
| 6,315,306 B1 | * | 11/2001 | Fernie et al. | 280/33.991 |
| 6,488,292 B2 | * | 12/2002 | O'Quin | 280/33.991 |
| 6,511,082 B2 | * | 1/2003 | Shirai | 280/79.11 |
| 6,669,212 B2 | * | 12/2003 | Porter | 280/33.991 |
| 6,793,223 B2 | * | 9/2004 | Ondrasik et al. | 280/47.35 |
| 6,848,695 B2 | * | 2/2005 | Panasewicz et al. | 280/33.998 |
| 6,860,493 B2 | * | 3/2005 | Orozco | 280/33.991 |
| 7,216,875 B2 | * | 5/2007 | O'Quin | 280/33.991 |
| 7,387,305 B2 | * | 6/2008 | Vanderberg et al. | 280/47.26 |
| 7,448,476 B2 | * | 11/2008 | Otterson | 188/19 |
| 7,448,632 B1 | * | 11/2008 | Nieto | 280/47.24 |
| 7,458,589 B2 | * | 12/2008 | Vanderberg et al. | 280/47.26 |
| 7,458,590 B2 | * | 12/2008 | Vanderberg et al. | 280/47.26 |
| 7,458,591 B2 | * | 12/2008 | Vanderberg et al. | 280/47.26 |
| 7,513,510 B2 | * | 4/2009 | Vanderberg et al. | 280/47.26 |

(Continued)

FOREIGN PATENT DOCUMENTS

DE 3841004 A1 * 6/1990

(Continued)

*Primary Examiner* — Hau Phan
*Assistant Examiner* — Jacob Meyer
(74) *Attorney, Agent, or Firm* — Brient Intellectual Property Law, LLC

(57) ABSTRACT

A hand truck, according to various embodiments comprises: (1) a frame, (2) a nose plate that is attached adjacent a lower end of the frame; and (3) at least one wheel that is adapted to facilitate the rolling movement of the dolly relative to a support surface. In particular embodiments, the hand truck comprises: (1) a first axle support adjacent a first lateral side of the frame; and (2) a second axle support adjacent a second lateral side of the frame. The first and second axle supports are adapted to cooperate with the first and second axle supports of a like hand truck body to facilitate the positioning of the hand truck body into a nested relationship with the like hand truck body.

13 Claims, 36 Drawing Sheets

U.S. PATENT DOCUMENTS

| | | | |
|---|---|---|---|
| 7,543,828 B2 * | 6/2009 | Vanderberg et al. | 280/47.26 |
| 7,549,653 B2 * | 6/2009 | Vanderberg et al. | 280/47.26 |
| 7,559,559 B2 * | 7/2009 | Vanderberg et al. | 280/47.26 |
| 7,677,580 B2 * | 3/2010 | Vanderberg et al. | 280/47.18 |
| 7,677,581 B2 * | 3/2010 | Vanderberg et al. | 280/47.26 |
| 7,857,108 B2 * | 12/2010 | Amdahl et al. | 188/19 |
| D644,396 S * | 8/2011 | Dechant et al. | D34/26 |
| 8,025,148 B2 * | 9/2011 | Artinger | 206/518 |
| 2003/0090073 A1 * | 5/2003 | Whang | 280/33.991 |
| 2003/0205873 A1 * | 11/2003 | Orozco | 280/33.991 |
| 2003/0205875 A1 * | 11/2003 | Ondrasik et al. | 280/47.34 |
| 2006/0103087 A1 * | 5/2006 | Alcala Sebastian | 280/47.26 |
| 2006/0175779 A1 * | 8/2006 | Zak | 280/33.998 |
| 2006/0237923 A1 * | 10/2006 | Vanderberg et al. | 280/35 |
| 2006/0237924 A1 * | 10/2006 | Vanderberg et al. | 280/35 |
| 2006/0237925 A1 * | 10/2006 | Vanderberg et al. | 280/35 |
| 2006/0237926 A1 * | 10/2006 | Vanderberg et al. | 280/35 |
| 2006/0237927 A1 * | 10/2006 | Vanderberg et al. | 280/35 |
| 2006/0237928 A1 * | 10/2006 | Vanderberg et al. | 280/35 |
| 2008/0122192 A1 * | 5/2008 | Goodman | 280/47.371 |
| 2008/0203688 A1 * | 8/2008 | Meyers et al. | 280/47.29 |
| 2012/0049472 A1 * | 3/2012 | Patterson et al. | 280/33.998 |

FOREIGN PATENT DOCUMENTS

| | | |
|---|---|---|
| DE | 3909078 A1 * | 6/1990 |
| EP | 430058 A1 * | 6/1991 |

* cited by examiner

HAND TRUCKS AND RELATED SHIPPING METHODS

CROSS-REFERENCE TO RELATED APPLICATIONS

This application claims priority from U.S. Provisional Application No. 61/424,053 filed on Dec. 16, 2010, entitled "Hand Trucks and Related Shipping Methods," which is hereby incorporated herein by reference in its entirety.

BACKGROUND

Hand trucks are commonly used to move items that are too heavy or bulky to be moved manually. Using such a device can reduce the amount of physical effort required to lift and move such heavy or bulky loads. At times, due to the bulky nature of typical hand truck designs, prior art hand trucks can be difficult and expensive to transport.

SUMMARY

A hand truck body, according to various embodiments, comprises: (1) a hand truck frame; (2) a support plate disposed adjacent to and extending forward from a bottom portion of the hand truck frame; (3) a first axle support disposed adjacent a first lateral side of the hand truck frame; and (4) a second axle support adjacent a second lateral side of the hand truck frame. In particular embodiments, the first and second axle supports are flared in opposite directions, so that the first and second axle supports cooperate to form a guide structure for guiding the hand truck body into a nested relationship with a like hand truck body.

A hand truck body comprising: (1) a hand truck frame; and (2) a support plate disposed adjacent to and extending from a bottom portion of the hand truck frame. In particular embodiments, the hand truck frame comprises: (1) a first vertical frame member adjacent a first lateral side of the hand truck frame; (2) a first angled axle support assembly that extends between a lower portion of the first vertical frame member and a first lateral side of the support plate; (3) a second vertical frame member adjacent a second lateral side of the hand truck frame; and (4) a second angled axle support assembly that extends between a lower portion of the second vertical frame member and a second lateral side of the support plate. In certain embodiments, the first angled axle support assembly is adapted to substantially mate with the first angled axle support of a like hand truck body when the hand truck body and the like hand truck body are placed in a nested relationship with each other; and the second angled axle support assembly is adapted to substantially mate with the second angled axle support of the like hand truck body when the hand truck body and the like hand truck body are placed in a nested relationship with each other.

BRIEF DESCRIPTION OF THE DRAWINGS

Various embodiments will be described below. In the course of the description, reference will be made to the accompanying drawings, which are not necessarily drawn to scale. Like numbers refer to like elements throughout.

DETAILED DESCRIPTION OF VARIOUS EMBODIMENTS

Figure 1:
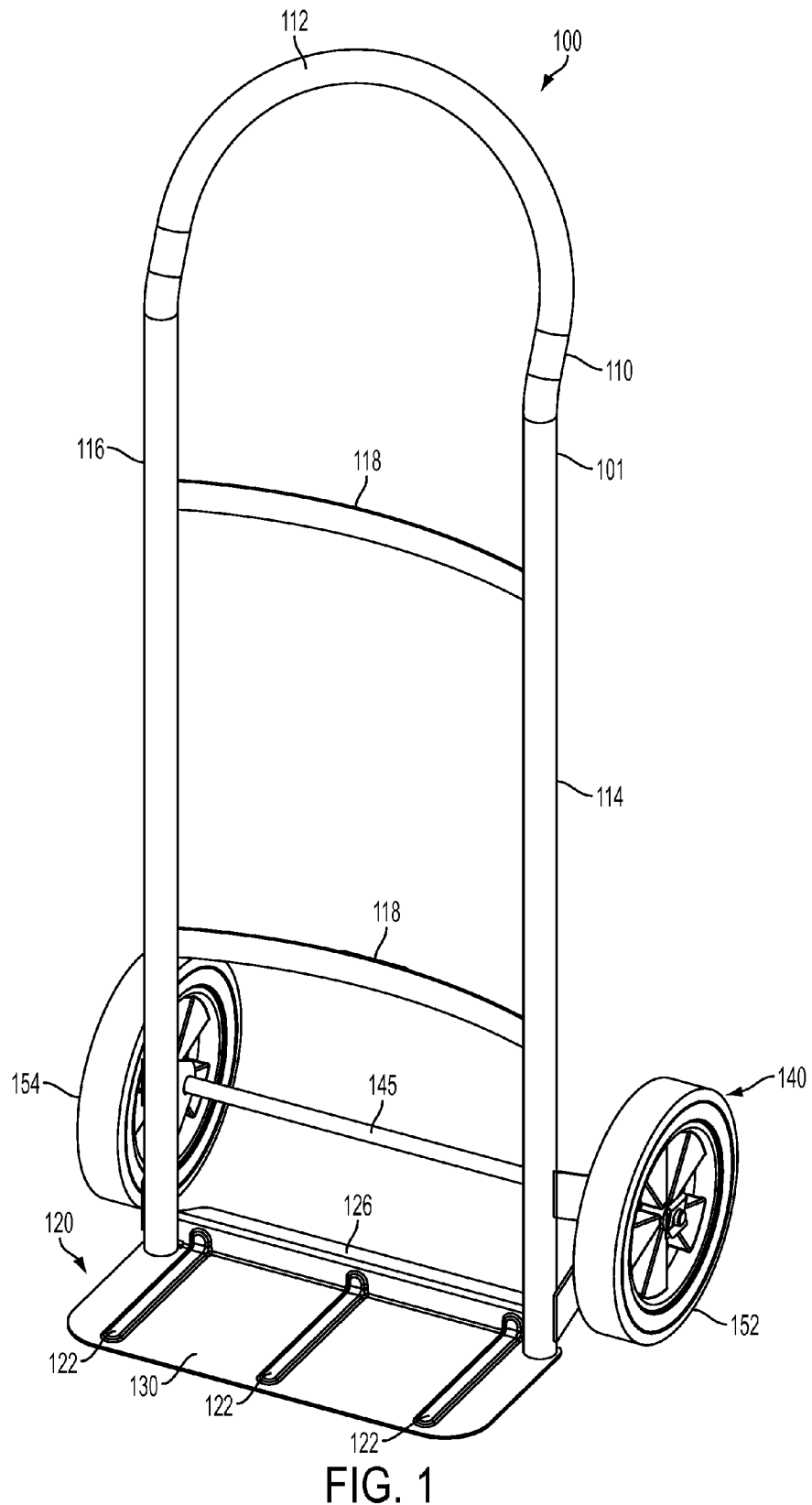
FIG. 1 is a front perspective view of a hand truck according to a first particular embodiment of the invention.
Figure 2:
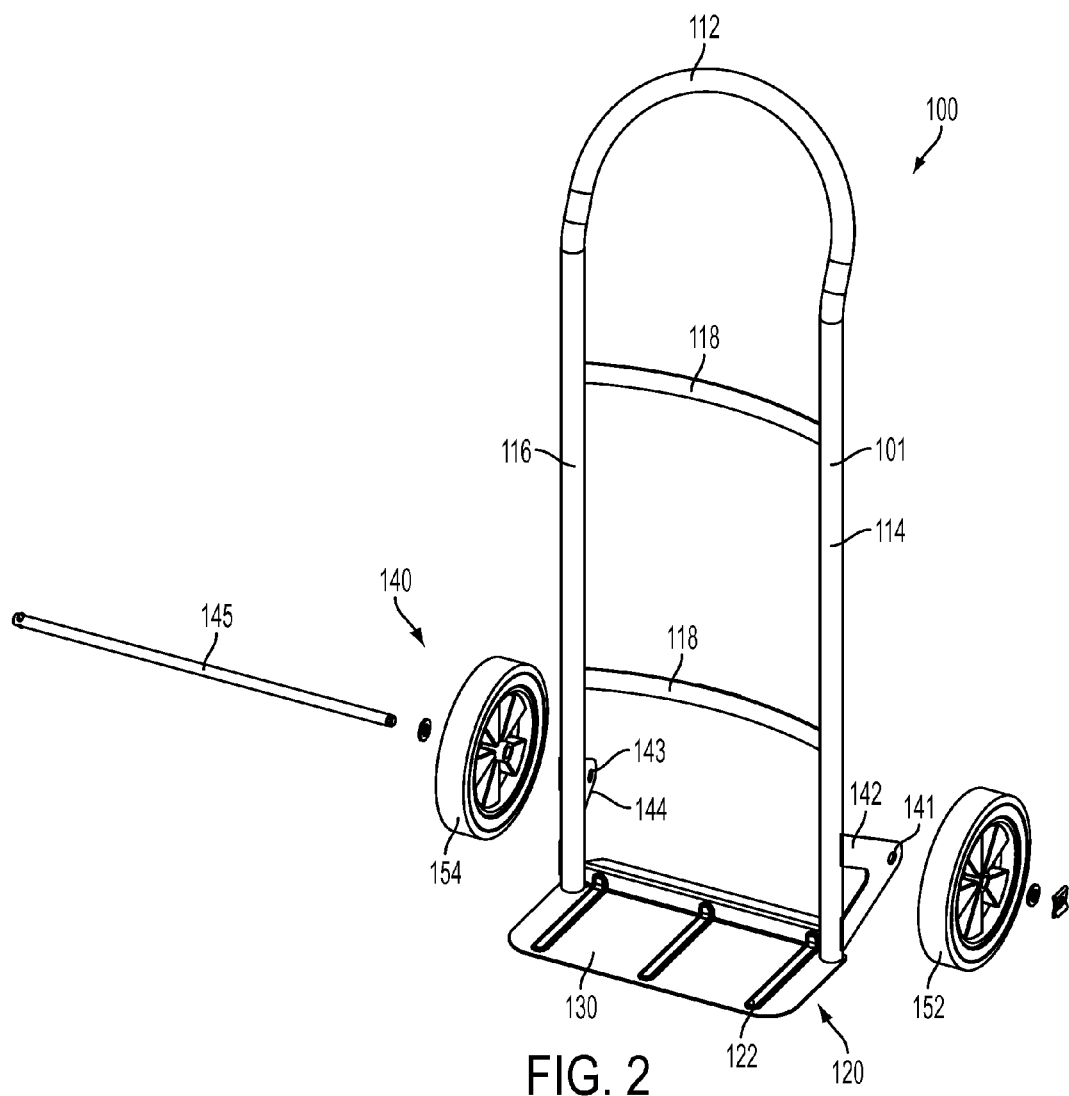
FIG. 2 is an exploded front perspective view of the hand truck of FIG. 1.
Figure 3:
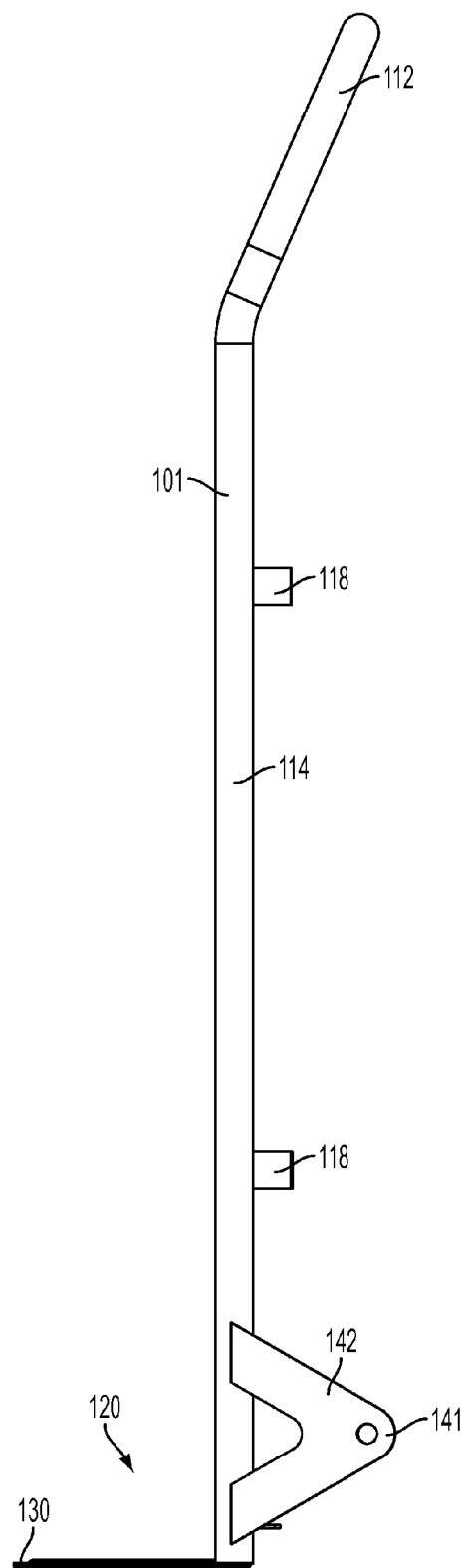
FIG. 3 is a side view of the body of the hand truck of FIG. 1.
Figure 4:
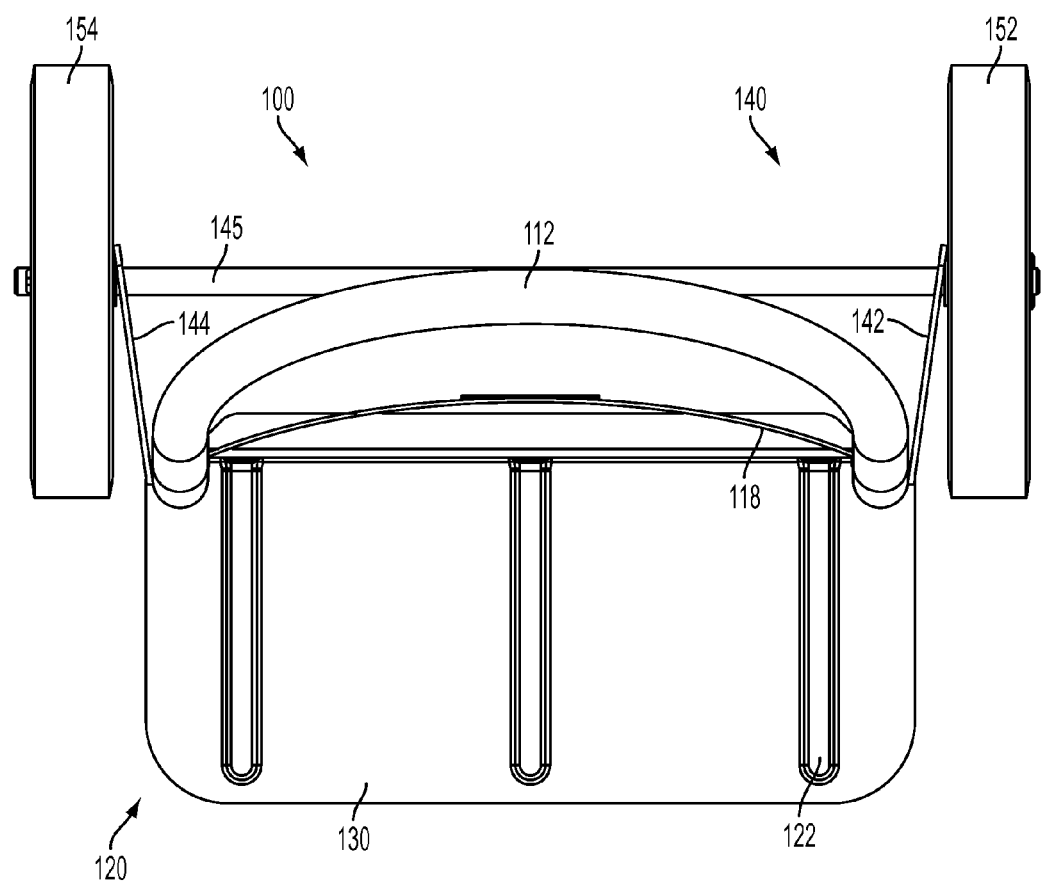
FIG. 4 is a top view of the hand truck of FIG. 1.

Various embodiments will now be described more fully hereinafter with reference to the accompanying drawings, in which various embodiments are shown. The claimed technology may, however, be embodied in many different forms and should not be construed as limited to the embodiments set forth herein. Rather, these embodiments are provided so that this disclosure will be thorough and complete, and will fully convey the scope of the technology to those skilled in the art. Like numbers refer to like elements throughout.

Overview of Various Hand Truck Designs

First Exemplary Hand Truck

An exemplary hand truck according to a particular embodiment is shown in FIGS. 1-6. In this embodiment, the hand truck 100 comprises: (1) a frame 110; (2) a nose plate 120; and (3) a wheel assembly 140. These various components are discussed in greater detail below.

Frame

The hand truck 100 may include any suitable type of frame 110. In the embodiment shown in FIG. 1, this frame 110 includes: (1) a first side frame rail 114 (which, in this embodiment, is a substantially straight, elongated frame member that is adapted to stand in a substantially vertical orientation when the hand truck 100 is in an upright position); (2) a second side frame rail 116 (which, in this embodiment, is a substantially straight, elongated frame member that is adapted to stand in a substantially vertical orientation when the hand truck 100 is in an upright position); (3) a U-shaped connector 112 that connects the respective top ends of the first and second side frame rails 114, 116; and (4) a plurality of crossbars 118 that extend between, and physically connect, the first and second side frame rails 114, 116.

The various components of the frame 110 may be made of any suitable (preferably sturdy) material (e.g., a suitable metal such as aluminum or steel, or plastic). These components are secured together using any suitable combination of fasteners or welding techniques to provide a rigid frame for the hand truck 100.

Nose Plate

The hand truck 100 may include any suitable type of nose plate 120. As shown in FIG. 1, the nose plate 120 may include: (1) a substantially planar support plate 130 extending forward from the frame 110; and (2) a substantially planar face plate 126 that extends upwardly adjacent a rear edge of the support plate 130. In various embodiments, the support plate 130 may define one or more elongated ribs 122 in its top surface. As discussed in greater detail below, these ribs 122 correspond to elongated recesses in the support plate's bottom surface. In particular embodiments, the ribs 122 serve to provide additional strength to the support plate 130, and may also facilitate nesting the hand truck's body 101 (e.g., the structure of the hand truck 100 other than the hand truck's axle 145 and wheels 152, 154) with like hand truck bodies. The nose plate 120 may be attached to the lower end of the hand truck's frame 110 in any suitable manner (e.g., using suitable fasteners or welding techniques).

Wheel Assembly

In particular embodiments, the hand truck's wheel assembly 140 is adapted for facilitating the movement of the hand truck 100 relative to a support surface. In the embodiment shown in FIG. 2, the wheel assembly 140 includes a first axle support 142 that extends outwardly and rearwardly adjacent the lower end of the first side frame rail 114 and a second axle support 144 that extends outwardly and rearwardly adjacent the lower end of the second side frame rail 116. The first and second axle supports 142, 144 each respectively define a substantially circular hole 141, 143 adjacent their distal end.

The hand truck 100 further includes an elongated axle 145 that extends through the holes 141, 143 in the first and second axle supports 142, 144 so that the axle 145 is substantially parallel to a support surface that supports the hand truck 100 when the hand truck 100 is in an upright orientation. The wheel assembly 140 further includes a pair of wheels 152, 154 that are rotatably mounted, respectively, to opposite ends of the axle 145.

In particular embodiments, the first axle support 142 is in the shape of a substantially planar trapezoid with the first axle support's proximal end being the trapezoid's larger parallel side. Similarly, the second axle support 144 is in the shape of a substantially planar trapezoid with the second axle support's proximal end being the trapezoid's larger parallel side. As may be understood form FIG. 4, in particular embodiments, the first and second axle supports 142, 144 are flared away from each other so that the axle supports' respective proximal ends are closer to each other than the axle supports' respective distal ends.

Nesting Multiple First Exemplary Hand Truck Bodies

In various embodiments, the body 101 of the first exemplary hand truck 100 is adapted to nest with hand truck bodies having a structure that is the same as, or substantially similar to, the structure of the first exemplary hand truck body 101 (e.g., with "like" hand truck bodies). As may be understood from FIGS. 5 and 6, the first and second axle supports 142, 144 are adapted for facilitating moving two like hand truck bodies 101, 101A into a mating relationship. In particular, the flared positioning of the first 142 and second 144 axle supports serves to guide the first hand truck body 101 into the correct lateral mating orientation with the second hand truck body 101A as: (1) the respective inside surfaces of the first hand truck body's first 142 and second 144 axle supports engage the respective outside surfaces of the second hand truck body's first 142A and second (not pictured) axle supports; and (2) the first hand truck body 101 is moved toward the second hand truck body 101A.

Figure 5:
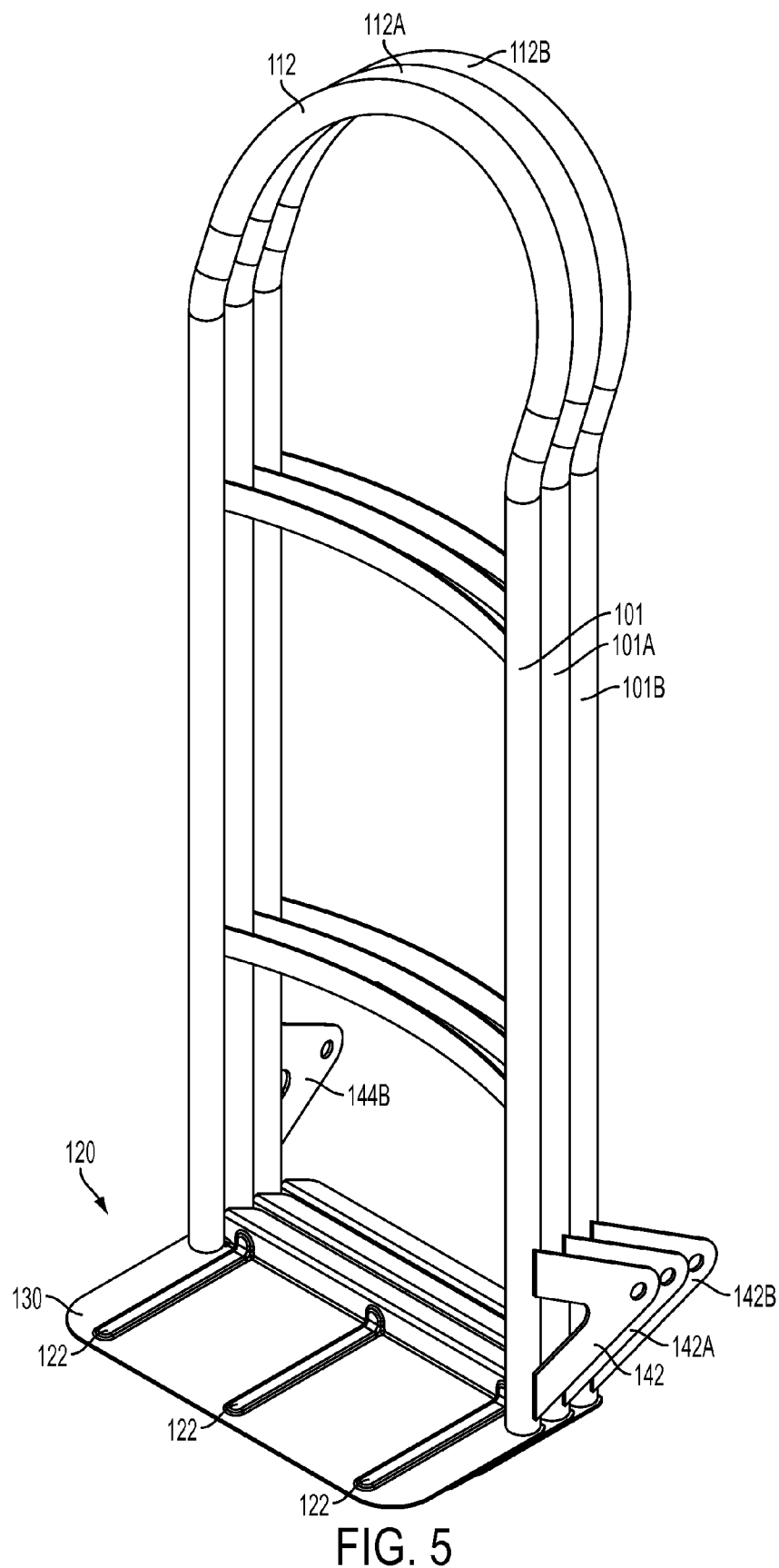
FIG. 5 is a front perspective view of three hand truck bodies having the same structure as the hand truck body of FIG. 1. This figure shows the three hand truck bodies in a nested, mating configuration.
Figure 6:
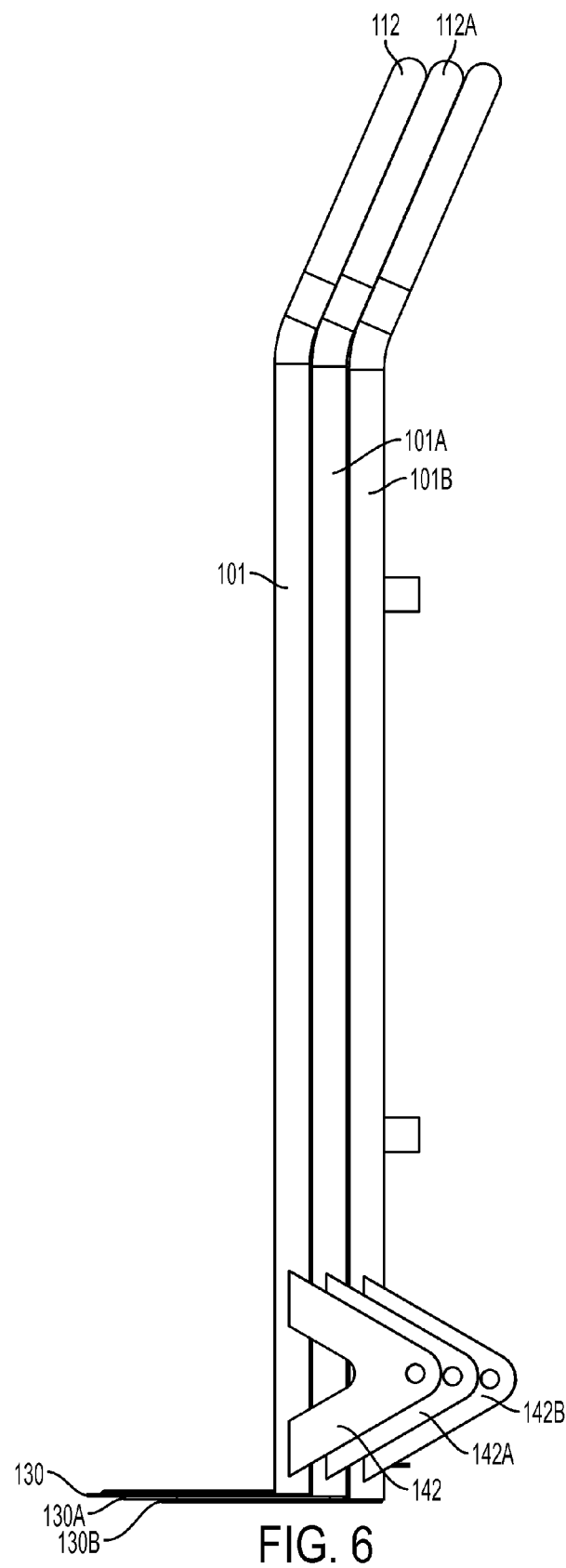
FIG. 6 is a side view of the three hand truck bodies of FIG. 5.

FIGS. 5 and 6 show three like hand truck bodies 101, 101A-101B in a nested, mating relationship. The hand truck bodies 101, 101A-101B are dimensioned so that, when the hand truck bodies 101, 101A-101B are positioned in a nested, mating relationship as shown in FIG. 5: (1) the rear portion of the front hand truck body (e.g., hand truck body 101) engages, and at least substantially mates with (e.g., entirely mates with), the front portion of the rear hand truck body (e.g., hand truck body 101A); (2) as may be understood from FIG. 6, the inner surfaces of the first axle support 142 and second axle support (not pictured) of the front hand truck body 101 at least substantially mate with (e.g., entirely mate with), the outer surfaces of the first axle support 142A and second axle support 144 of the rear hand truck body (e.g., hand truck body 101A); (3) as shown in FIG. 6, the lower surface of the front hand truck body's support plate 130 engages, and at least substantially mates with (e.g., entirely mates with) the upper surface of the rear hand truck body's support plate 130A. For example, the various recesses defined in the lower surface of the front hand truck body's support plate 130 may substantially mate with respective ribs 122 defined in the upper surface of the rear hand truck body's support plate 130A; (4) as shown in FIG. 5, the rear surface of the U-shaped connector 112 of the front hand truck body 101 at least substantially mates with (e.g., entirely mates with) the front surface of the rear hand truck body's U-shaped connector 112A.

Although FIGS. 5 and 6 show the hand truck bodies 101, 101A-101B in a nested, mating relationship in which there is nothing between the various hand truck bodies 101, 101A-101B, it should be understood that the hand truck bodies 101, 101A-101B nest with like hand truck bodies with one or more objects positioned between the respective hand truck bodies. For example, in particular embodiments, marketing literature or a kit (e.g., a relatively thin kit) that includes one or more hand truck components (e.g., wheels and an axle for the hand truck) may be positioned between the hand truck bodies while the hand truck bodies are in a substantially nested relationship.

Second Exemplary Hand Truck

An exemplary hand truck according to a further embodiment is shown in FIGS. 7-12. In this embodiment, the hand truck 200 comprises: (1) a frame 210; (2) a nose plate 220; and (3) a wheel assembly 240. These various components are discussed in greater detail below.

Frame

Figure 7:
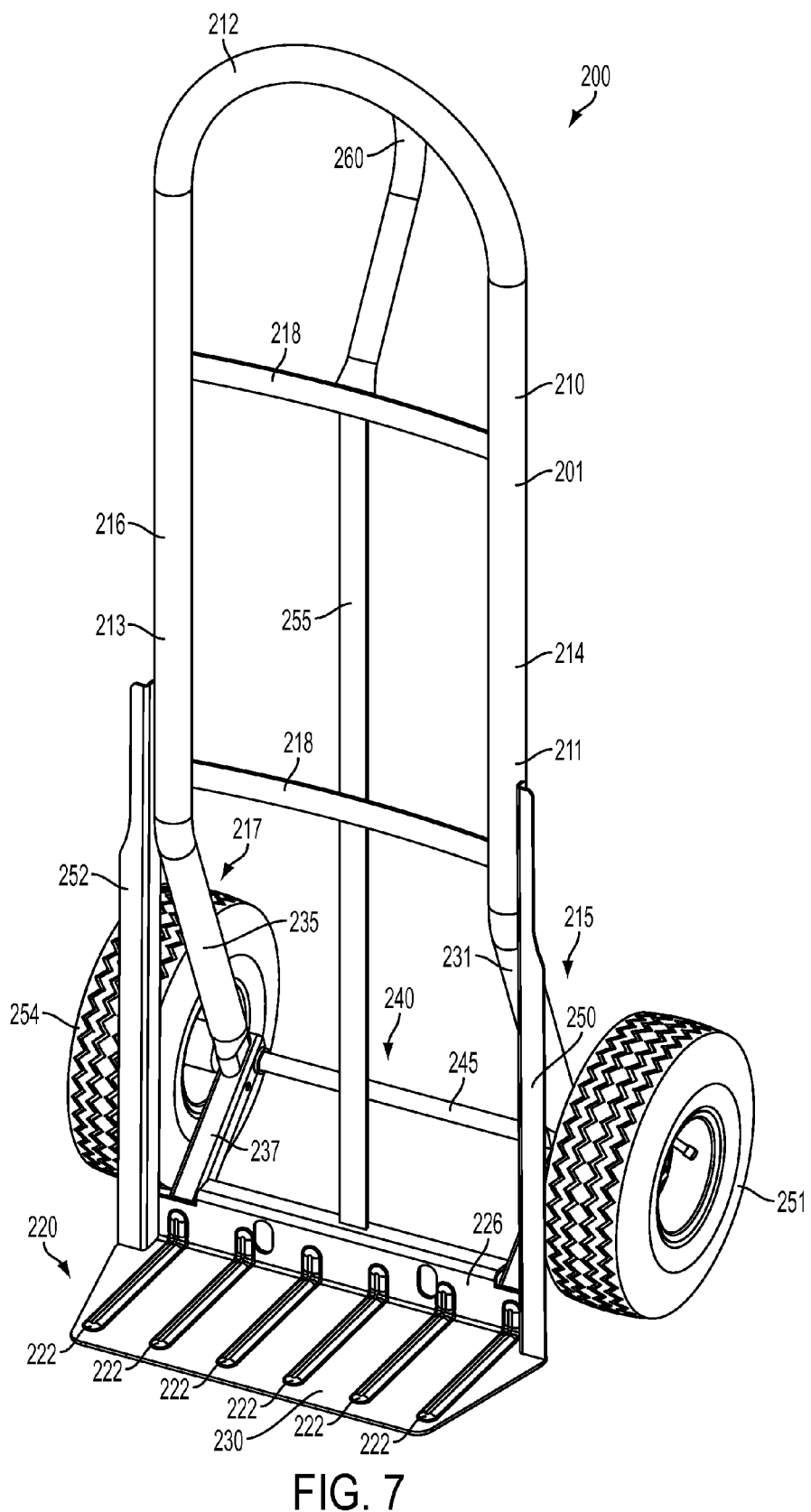
FIG. 7 is a front perspective view of a hand truck according to a further embodiment of the invention.

The hand truck 200 may include any suitable type of frame 210. In the embodiment shown in FIG. 7, this frame 210 includes: (1) a first side frame rail 214; (2) a second side frame rail 216; (3) an upper connecting portion 212 that connects the respective top ends of the first and second side frame rails 214, 216; (4) a plurality of crossbars 218 that extend between, and physically connect, the first and second side frame rails 214, 216; (5) an elongated, substantially planar central support 255 that extends between the upper cross bar 218 and a rear middle edge of the nose plate 220; (6) a handle 260 that extends in a rearwardly directed arch between the upper portion of the central support 255 and the central portion of the upper connecting portion 212 as shown in FIG. 7; (7) a first elongated exterior support 250 that extends between the lower end of the upper portion 211 of the first side frame rail 214 and a first upper surface of the support plate 230; and (8) a second elongated exterior support 252 that extends between the lower end of the upper portion 213 of the second side frame rail 216 and a second upper surface of the support plate 230.

In the embodiment shown in FIG. 7, the first side frame rail 214 includes: (1) a substantially straight, elongated upper portion 211 that is adapted to stand in a substantially vertical orientation when the hand truck 200 is in an upright position; and (2) a first rearwardly extending angled axle support assembly 215 that extends between the lower end of the first side frame rail's elongated upper portion 211 and the first lateral side of the support plate 230.

Figure 8:
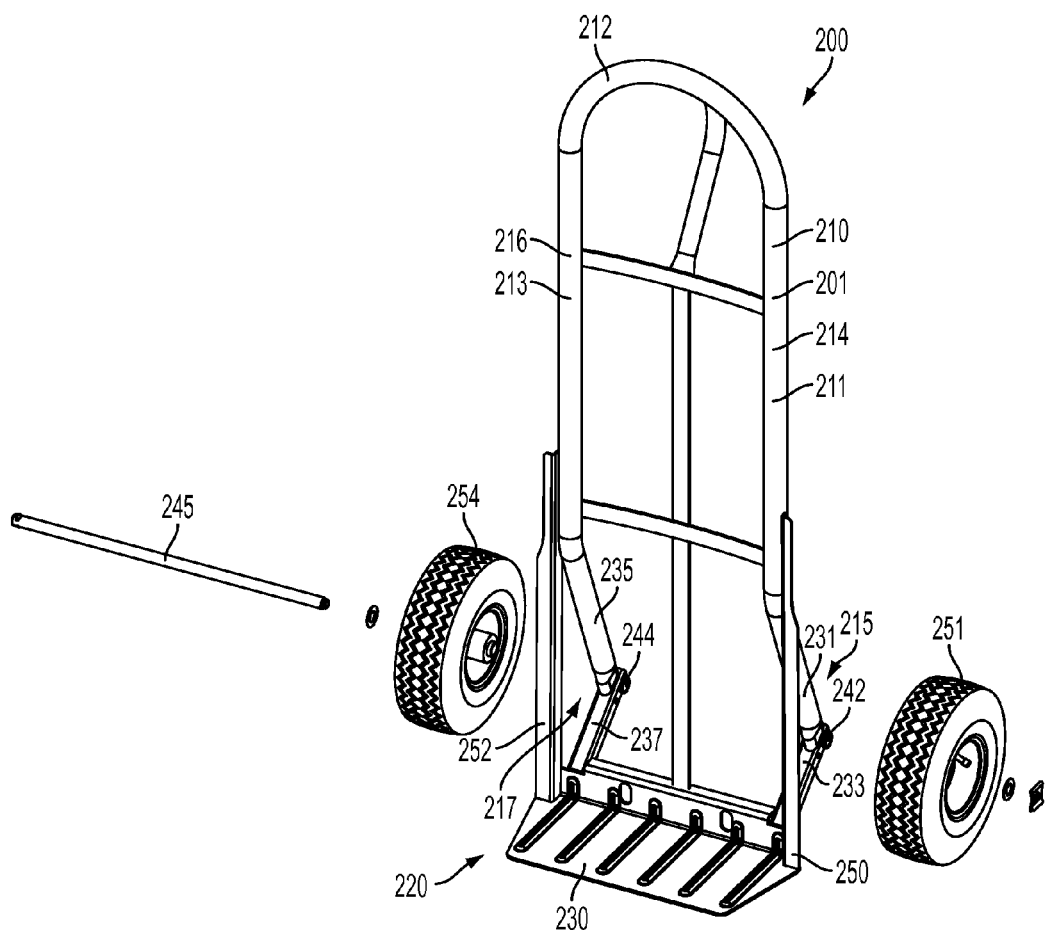
FIG. 8 is a front perspective exploded view of the hand truck body of FIG. 7.
Figure 9:
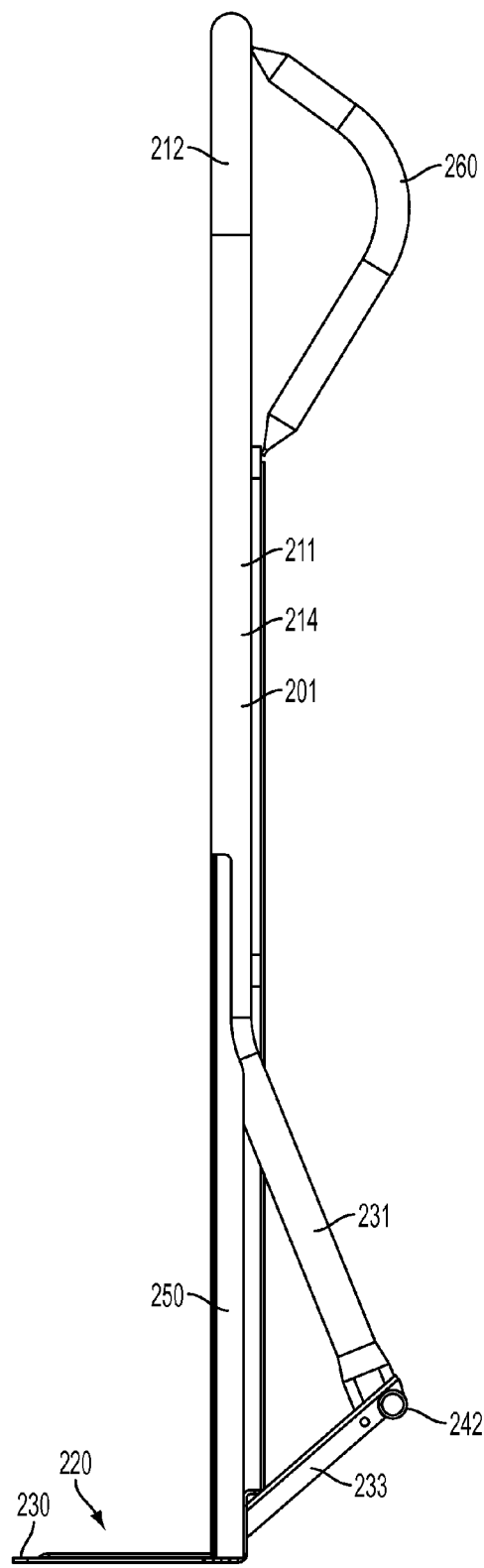
FIG. 9 is a side view of the hand truck body shown in FIG. 8.
Figure 10:
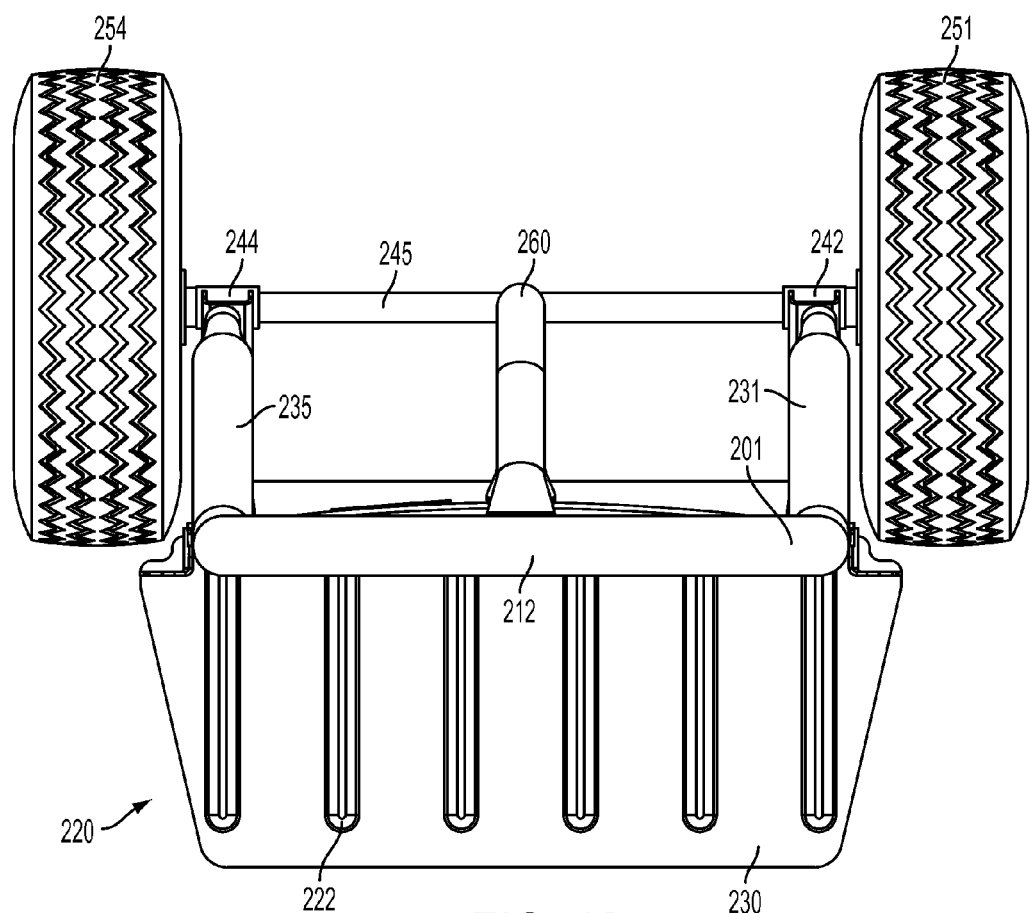
FIG. 10 is a top view of the hand truck shown in FIG. 7.

In the embodiment shown in FIG. 8, the first axle support assembly 215 comprises: (1) an elongated upper support member 231 that extends rearwardly and downwardly from the lower end of the first side frame rail's elongated upper portion 211; (2) an elongated lower support member 233 that extends rearwardly and upwardly from the first lateral side of the support plate 230; and (3) a first axle support 242 that is positioned at a vertex of an angle formed by the upper and lower support members 231, 233. In particular embodiments, the first axle support 242 is an elongated tube that is adapted for physically supporting a portion of an axle 245.

In particular embodiments of the disclosed technology, the upper support member 231 and lower support member 233 form an angle of between about 50 and about 90 degrees. Also, in various embodiments, such as the embodiment shown in FIG. 8, the upper and lower support members 231, 233 are positioned in a plane that is at least substantially perpendicular to (e.g., perpendicular to) the plane that includes the respective upper portions of the hand truck's first and second side frame rails 211, 213.

As shown in FIG. 7, the first exterior support 250 extends at least substantially vertically (e.g., vertically) when the hand truck 200 is in an upright orientation. In particular embodiments, the first exterior support 250 is positioned immediately adjacent the exterior lateral side of the first axle support assembly 215. Similarly, the second exterior support 252 extends at least substantially vertically (e.g., vertically) when the hand truck 200 is in an upright orientation. In particular embodiments, the second exterior support 252 is positioned immediately adjacent the exterior lateral side of the second axle support assembly 217.

In particular embodiments, the second side frame rail 216 includes: (1) a substantially straight, elongated upper portion 213 that is adapted to stand in a substantially vertical orientation when the hand truck 200 is in an upright position; and (2) a second rearwardly extending angled axle support assembly 217 that extends between the lower end of the second side frame rail's elongated upper portion 213 and the second lateral side of the support plate 230.

In the embodiment shown in FIGS. 7 and 8 the second axle support assembly 217 comprises: (1) an elongated upper support member 235 that extends rearwardly and downwardly from the lower end of the second side frame rail's elongated upper portion 213; (2) an elongated lower support member 237 that extends rearwardly and upwardly from the second lateral side of the support plate 230; and (3) a second axle support 244 that is positioned at a vertex of an angle formed by the second upper and lower support members 235, 237. In particular embodiments, the second axle support 244 is an elongated tube that is adapted for physically supporting a portion of the axle 245.

In particular embodiments of the disclosed technology, the upper support member 235 and lower support member 237 form an angle of between about 50 and about 90 degrees. Also, in various embodiments, such as the embodiment shown in FIG. 8, the upper and lower support members 235, 237 are positioned in a plane that is at least substantially perpendicular to (e.g., perpendicular to) the plane that includes the respective upper portions of the first and second side frame rails 214, 216.

The various components of the frame 210 may be made of any suitable (preferably sturdy) material (e.g., a suitable metal such as steel or aluminum, or plastic). These components are secured together using any suitable combination of fasteners or welding techniques to provide a rigid frame for the hand truck 200.

Nose Plate

The hand truck 200 may include any suitable type of nose plate 220. As shown in FIG. 7, the nose plate 220 may include: (1) a substantially planar support plate 230 extending forward from the frame 210; and (2) a substantially planar face plate 226 that extends upwardly adjacent a rear edge of the support plate 230. In various embodiments, the support plate 230 may define one or more elongated ribs 222 in its top surface. As discussed in greater detail below, these ribs 222 correspond to elongated recesses in the support plate's bottom surface. In particular embodiments, the ribs 222 serve to provide additional strength to the support plate 230, and may also facilitate nesting the hand truck body 201 with similar hand truck bodies. The nose plate 220 may be attached to the lower end of the frame 210 in any suitable manner (e.g., using suitable fasteners or welding techniques).

Wheel Assembly

In particular embodiments, the wheel assembly 240 is adapted for facilitating the movement of the hand truck 200 relative to a support surface. In the embodiment shown in FIG. 8, the wheel assembly 240 includes: (1) the first rearwardly extending angled axle support assembly 215; (2) the second rearwardly extending angled axle support assembly 217; (3) an elongated hand truck axle 245 that extends through the first and second axle supports 242, 244 so that the axle 245 is substantially parallel to a support surface that supports the hand truck 200 when the hand truck 200 is in an upright orientation; and (4) a pair of wheels 251, 254 that are rotatably mounted, respectively, to opposite ends of the axle 245.

Nesting Multiple Second Exemplary Hand Truck Bodies

In various embodiments, the body 201 of the second exemplary hand truck 200 is adapted to nest with hand truck bodies having a structure that is the same as, or substantially similar to, the structure of the second exemplary hand truck body 201 (e.g., with "like" hand truck bodies). As may be understood from FIGS. 11 and 12, the first and second angled axle support assemblies 215, 217 and first and second exterior supports 250, 252 are adapted for facilitating moving two like hand truck bodies 201, 201A into a nested, mating relationship. In particular, as may be understood from 11 and 12: (1) the angled, rearwardly extending first and second angled axle support assemblies 215A, 217A of a hand truck body 201A each respectively form a recess for receiving the corresponding first or second angled axle support assembly 215, 217 of a like hand truck body 201; (2) the first exterior support 250A is adapted to engage the exterior surface of the like hand truck body's first angled axle support assembly 215; and (3) the second exterior support 252A is adapted to engage the exterior surface of the like hand truck body's second angled axle support assembly 217. This serves to: (1) facilitate guiding the two like hand truck bodies into a nested, mating relationship (e.g., as shown in 11); and (2) maintain the nested, like hand truck bodies in a nested, mating relationship (e.g., while the hand truck bodies are being transported).

Figure 11:
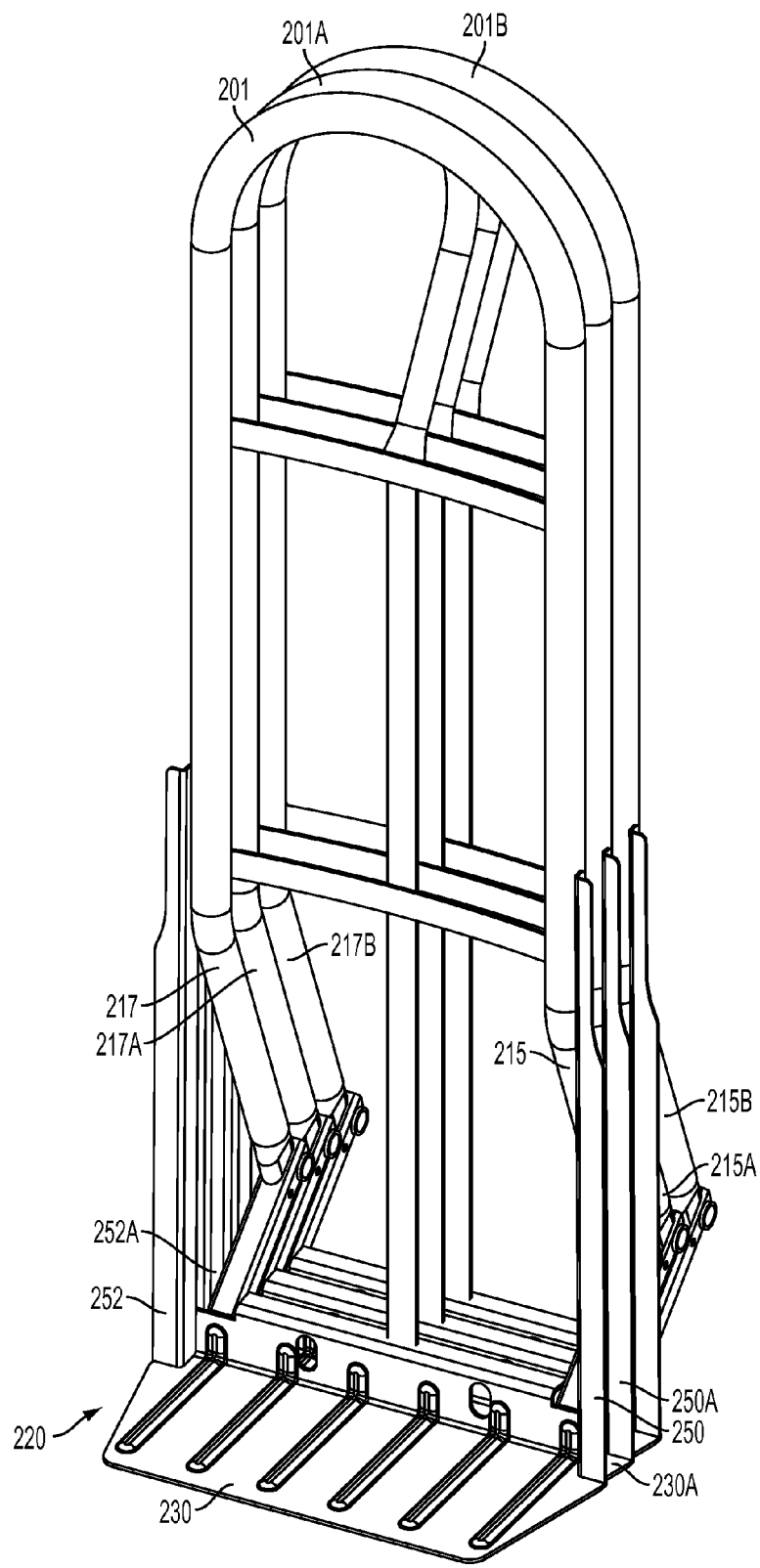
FIG. 11 is a front perspective view of three hand truck bodies having the same structure as the hand truck body of FIG. 8. This figure shows the three hand truck bodies in a nested, mating configuration.
Figure 12:
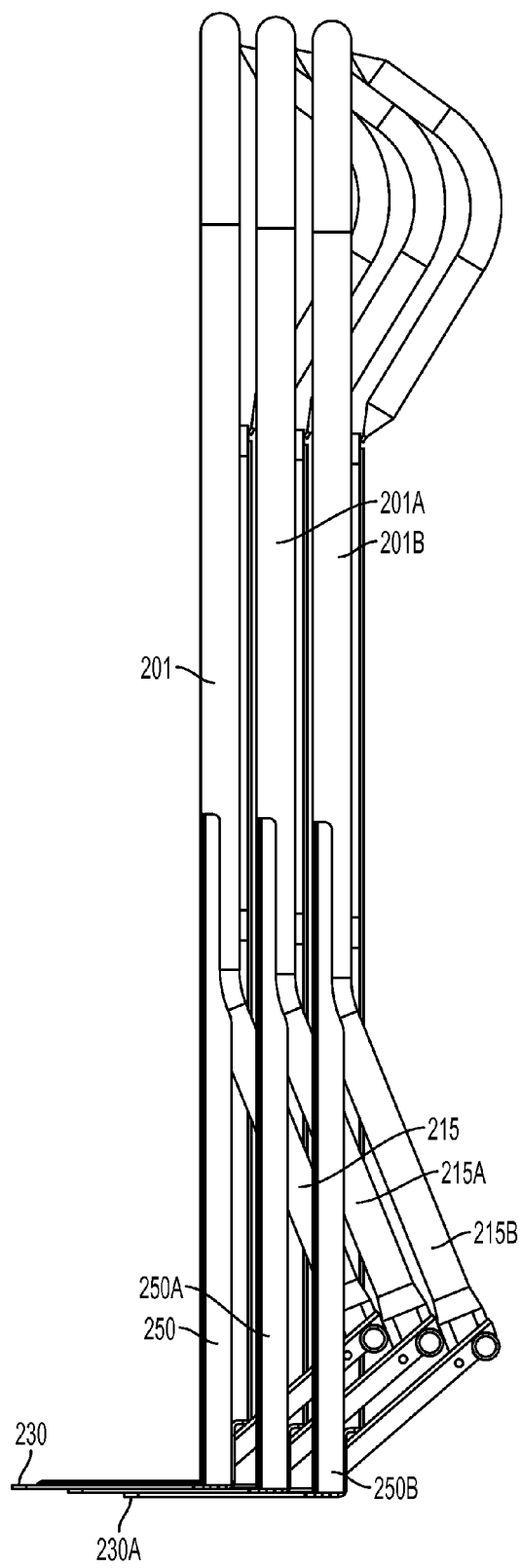
FIG. 12 is a side view of the three hand truck bodies of FIG. 11.

FIGS. 11 and 12 show three like hand truck bodies 201, 201A-201B in a nested, mating relationship. As shown in this figure, in this embodiment, the hand truck bodies 201, 201A-201B are dimensioned so that, when the hand truck bodies 201, 201A-201B are positioned in a nested, mating relationship: (1) the rear portion of the body of the front hand truck (e.g., hand truck body 201) engages, and at least substantially mates with (e.g., entirely mates with), the front portion of the body of the rear hand truck body (e.g., hand truck body 201A); (2) the outer surfaces of the first and second angled axle support assemblies 215, 217 of the front hand truck body (e.g., hand truck body 201) at least substantially mate with (e.g., entirely mate with), the inner surfaces of the first and second angled axle support assemblies 215A, 217A of the rear hand truck body (e.g., hand truck body 201A); (3) the lower surface of the front hand truck body's support plate 230 engages, and at least substantially mates with (e.g., entirely mates with), the upper surface of the rear hand truck body's support plate 230A. For example, the various recesses in the lower surface of the front hand truck body's support plate 230 may substantially mate with respective ribs defined in the upper surface of the rear hand truck body's support plate 230A. As a result, the nesting of the like hand truck bodies and the like axle support assemblies may restrict the lateral movement of the hand trucks.

Third Exemplary Hand Truck

An exemplary hand truck according to a further embodiment is shown in FIGS. 13-19. In this embodiment, the hand truck 300 comprises: (1) a frame 310; (2) a nose plate 320; and (3) a wheel assembly 340. These various components are discussed in greater detail below.

Frame

The hand truck 300 may include any suitable type of frame 310. In the embodiment shown in FIG. 13, the frame 310 is substantially structurally similar (e.g., identical) to the frame 210 of the embodiment of the hand truck 200 shown in FIG. 7 without the handle 260 or upper connecting portion 212. In the embodiment of a hand truck 300 shown in FIG. 13, the frame 310 further comprises a first handle 362 that extends upwardly from an upper end of the first side frame rail 314 and a second handle 360 that extends upwardly from an upper end of the second side frame rail 316.

Nose Plate

Figure 13:
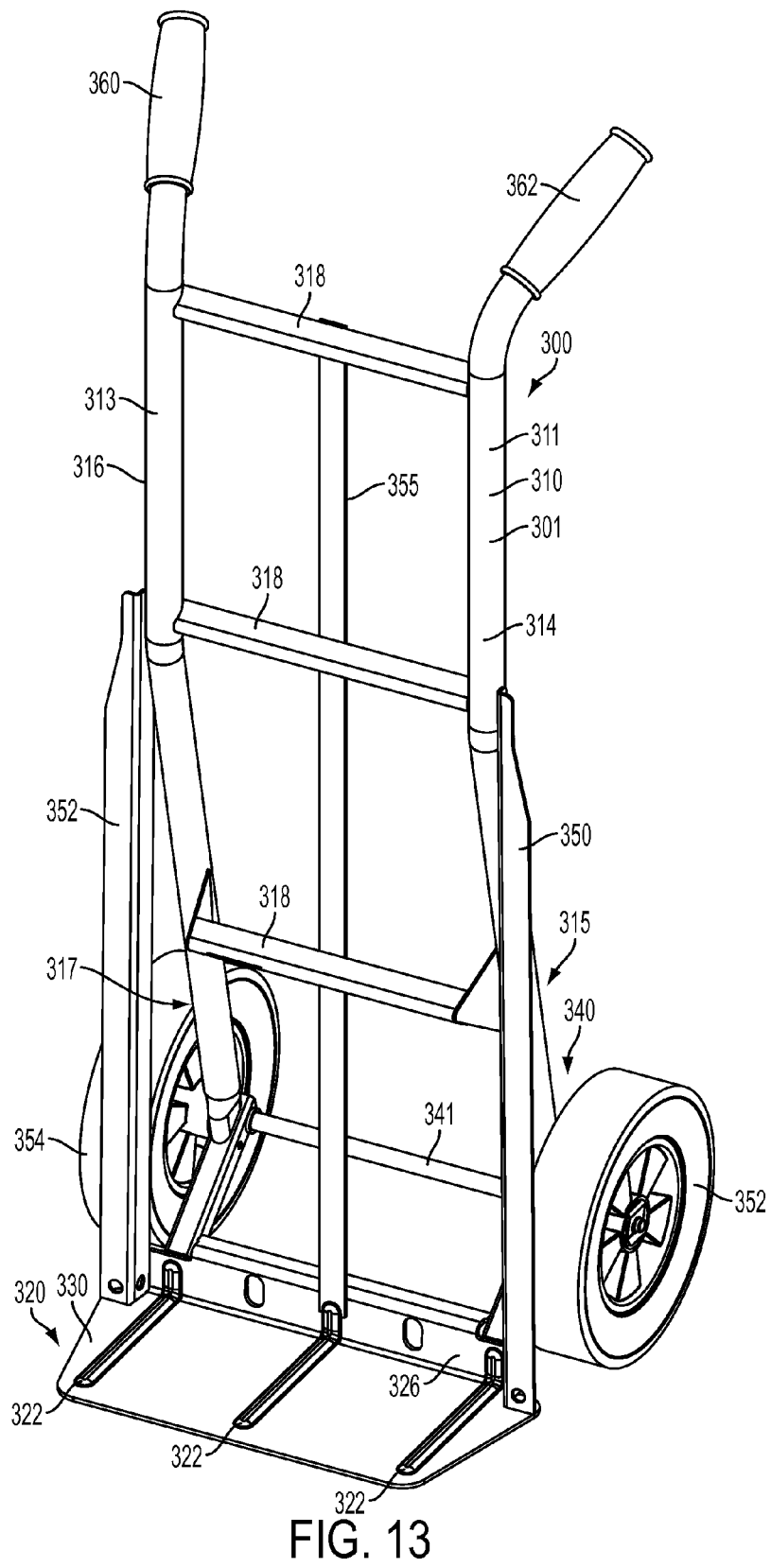
FIG. 13 is a front perspective view of a hand truck according to a further embodiment of the invention.
Figure 14:
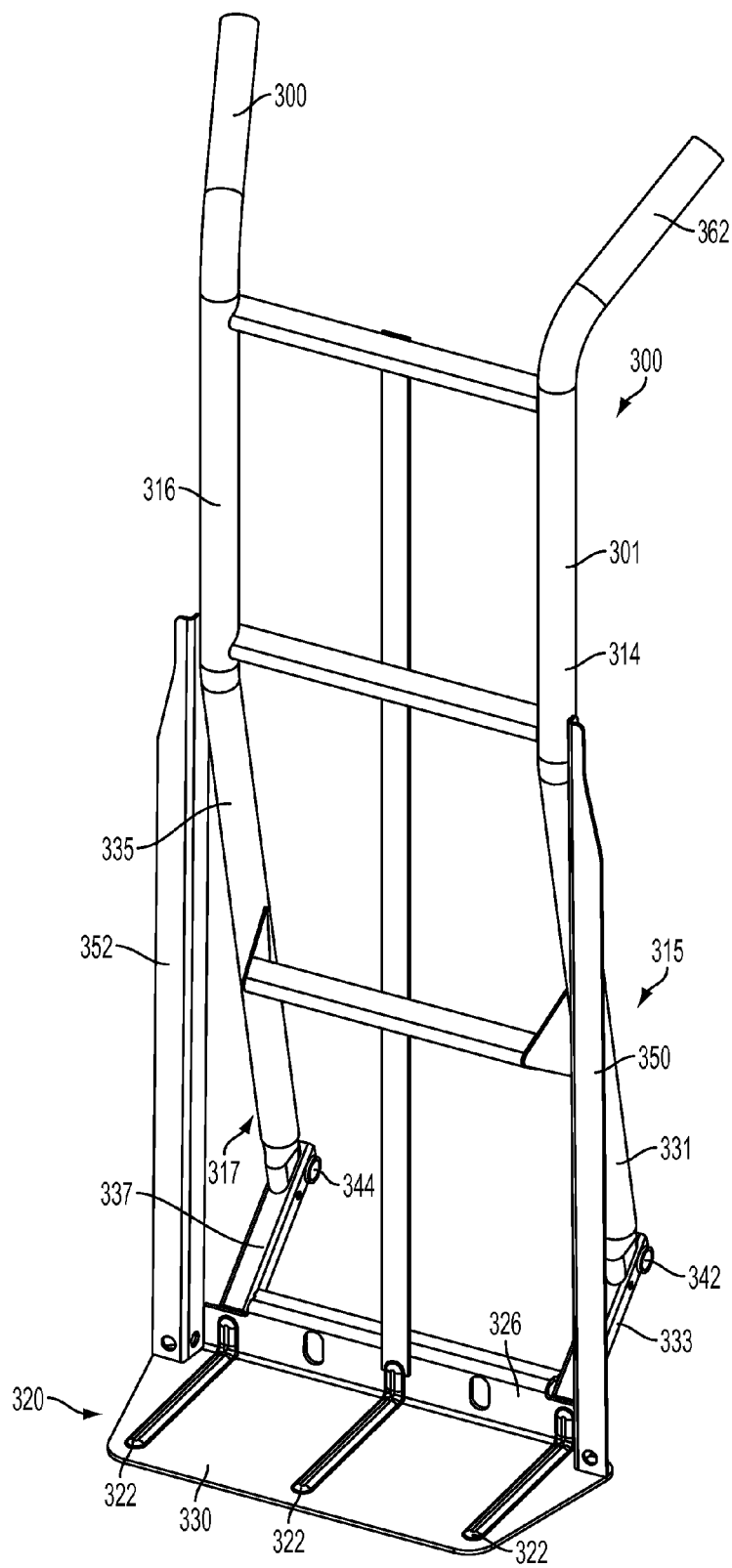
FIG. 14 is a front perspective view of the hand truck of FIG. 13 with its wheels and axle removed.
Figure 15:
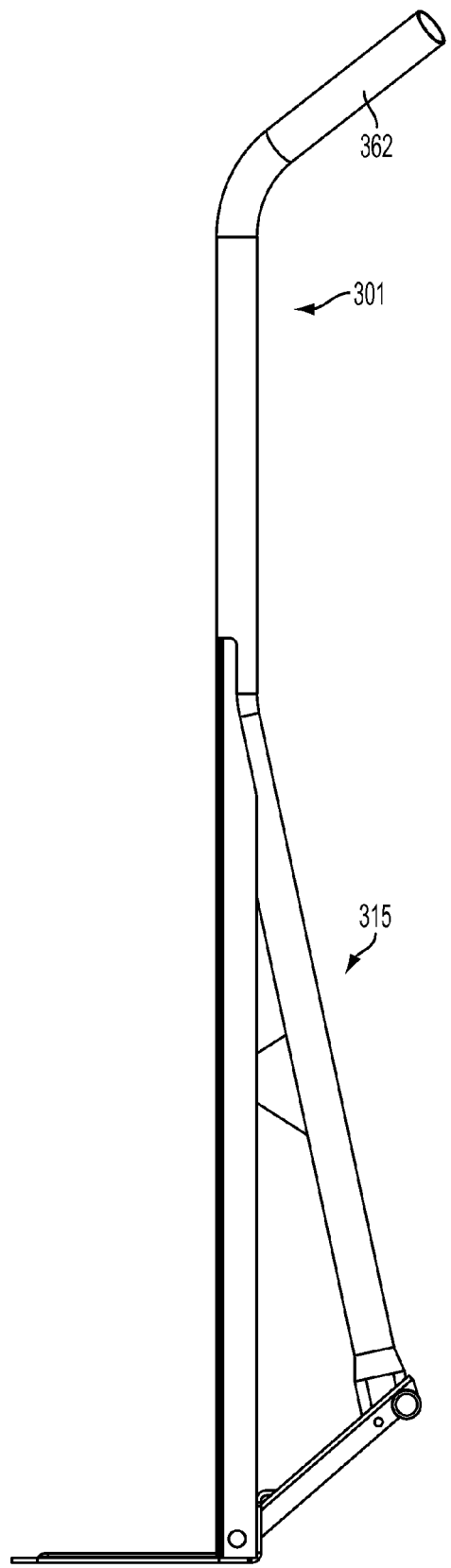
FIG. 15 is a side view of the hand truck body of FIG. 13.
Figure 16:
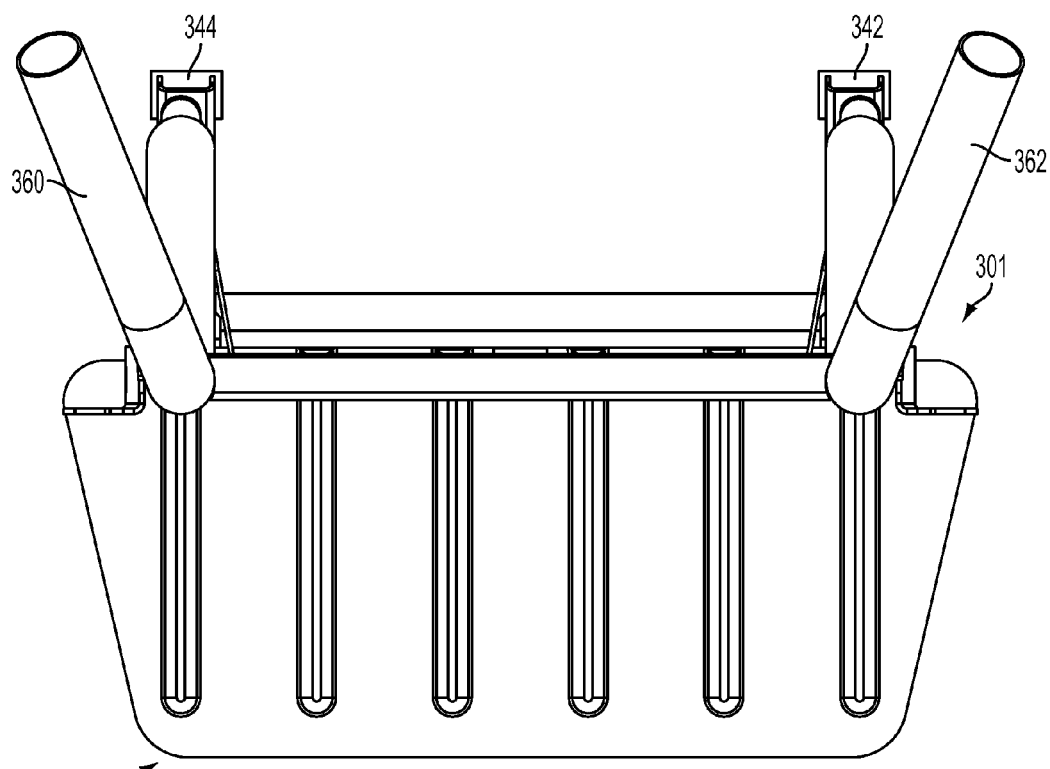
FIG. 16 is a top view of the hand truck body of FIG. 13.

In the embodiment shown in FIG. 13, the hand truck 300 includes a nose plate 320 that is substantially structurally similar (e.g., identical) to the nose plate 220 of the embodiment of a hand truck 200 shown in FIG. 7.

Wheel Assembly

In the embodiment shown in FIG. 13, the hand truck 300 also includes a wheel assembly 340 that is substantially structurally similar (e.g., identical) to the wheel assembly 240 of the embodiment of a hand truck 200 shown in FIG. 7.

Nesting Multiple Third Exemplary Hand Truck Bodies

Figure 17:
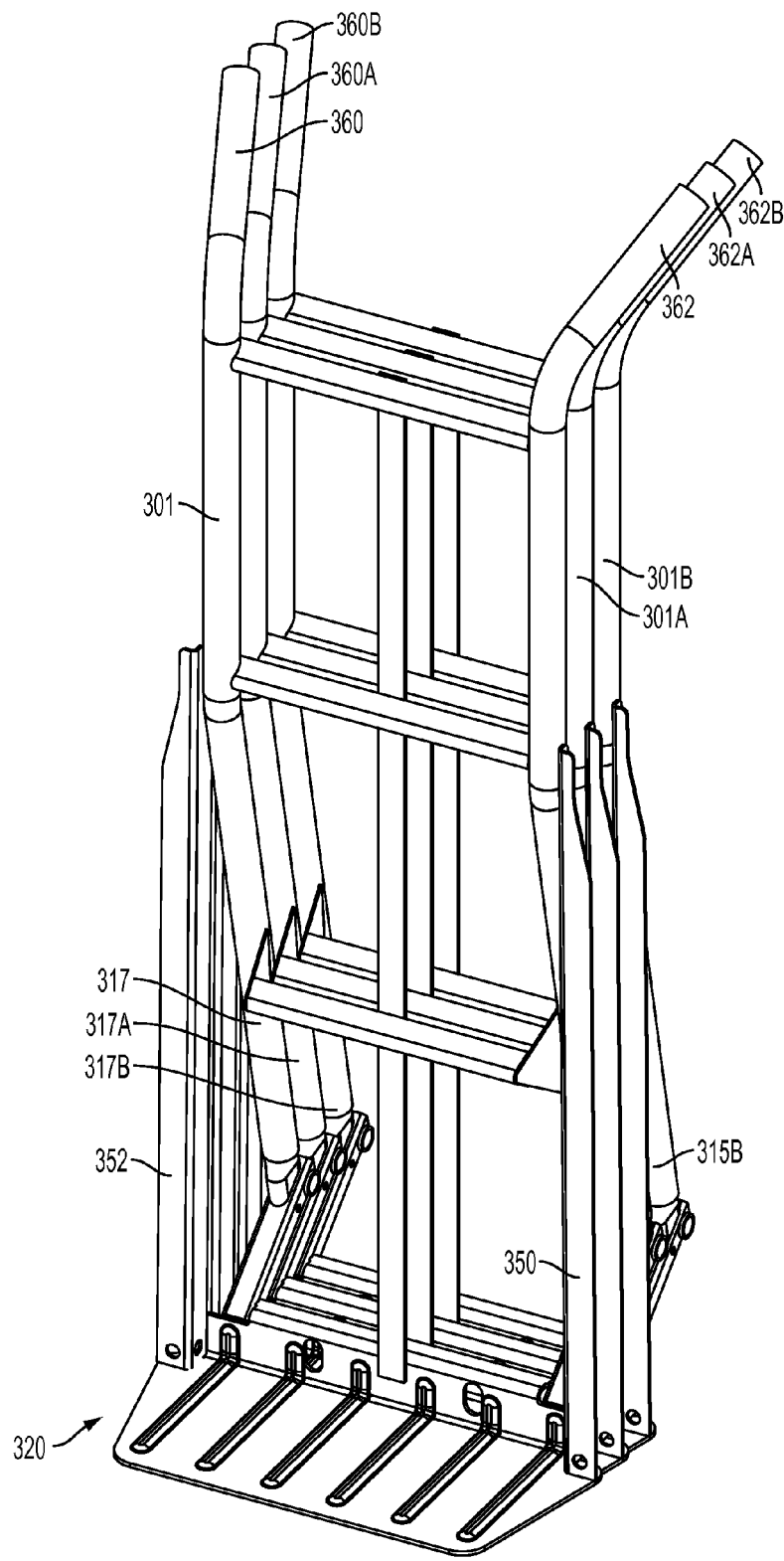
FIG. 17 is a front perspective view of three hand truck bodies having the same structure as the hand truck body of FIG. 13. This figure shows the three hand truck bodies in a nested, mating configuration.
Figure 18:
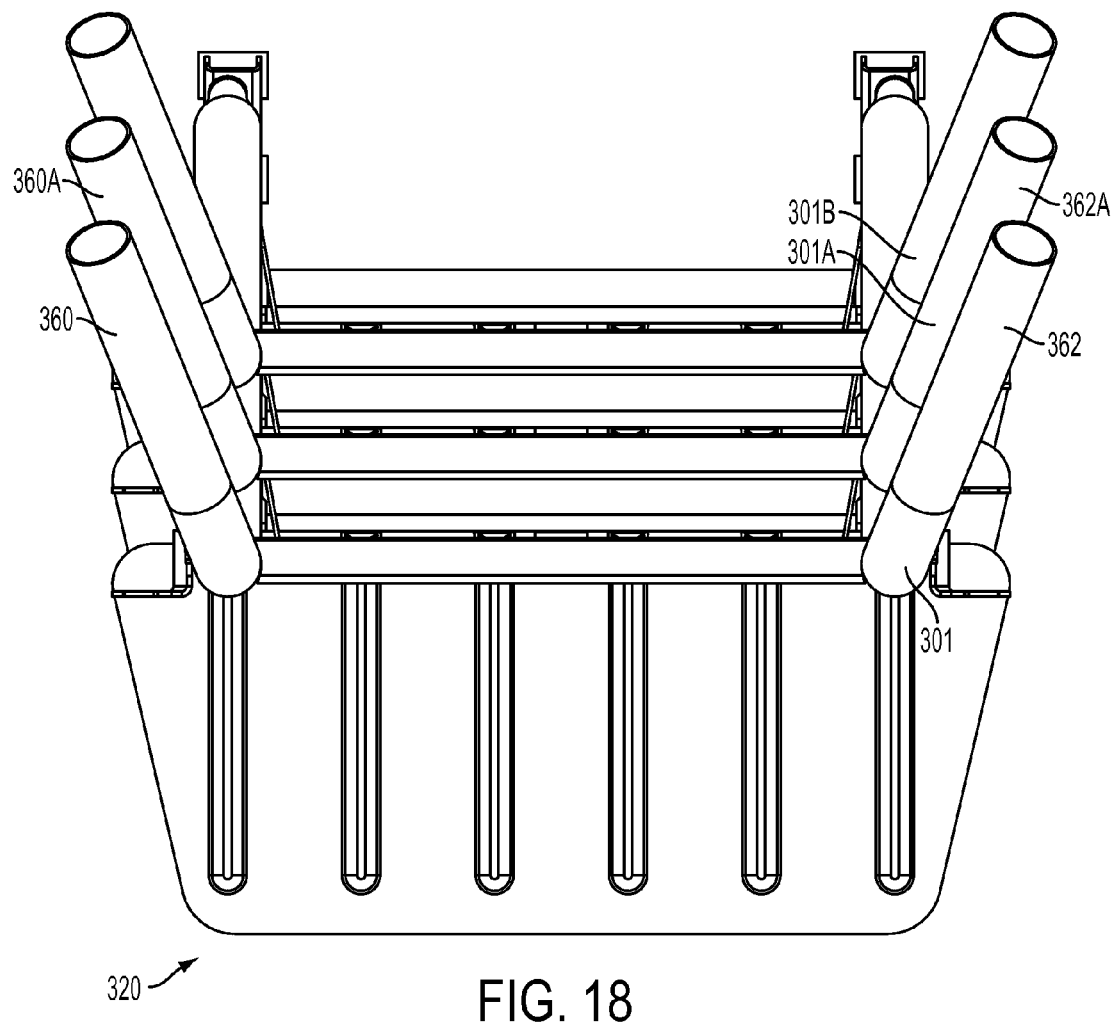
FIG. 18 is a top view of the three hand truck bodies of FIG. 17.
Figure 19:
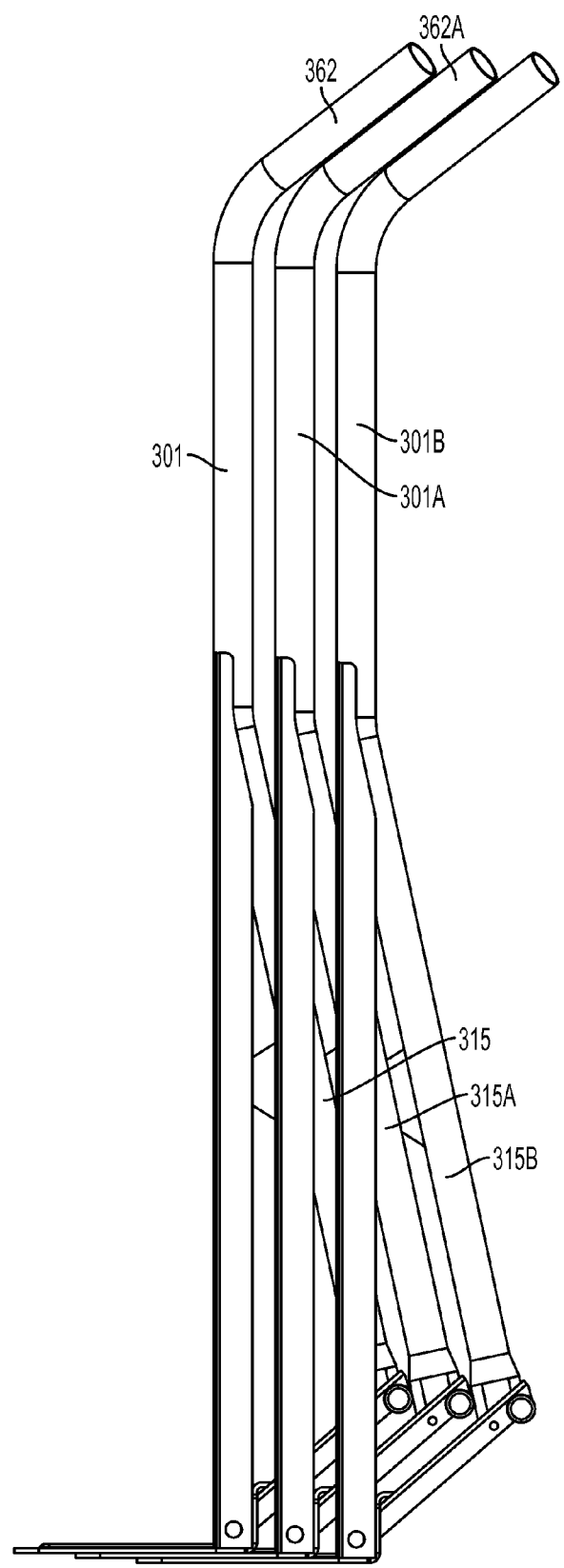
FIG. 19 is a side view of the three hand truck bodies of FIG. 17.

In various embodiments, the body 301 of the third exemplary hand truck 300 is adapted to nest with hand truck bodies having a structure that is the same or substantially similar to the structure of the third exemplary hand truck body 301 (e.g., with "like" hand truck bodies). As may be understood from FIG. 17, the hand truck body 301 is adapted to nest with like hand truck bodies in substantially the same manner as the hand truck body 201 of FIG. 7 is adapted to nest with like hand truck bodies FIG. 17 shows three like hand truck bodies 301, 301A-301B in a nested, mating relationship. As may be understood from FIGS. 17-19, in this embodiment, the hand truck bodies 301, 301A-301B are dimensioned so that, when the hand truck bodies 301, 301A-301B are positioned in a nested, mating relationship, the rear portion of the first 362 and second 360 handles of the front hand truck body 301 at least substantially mate with (e.g., entirely mate with) the front of the first 362A and second 360A handles of the rear hand truck body 301A.

Fourth Exemplary Hand Truck

Figure 20:
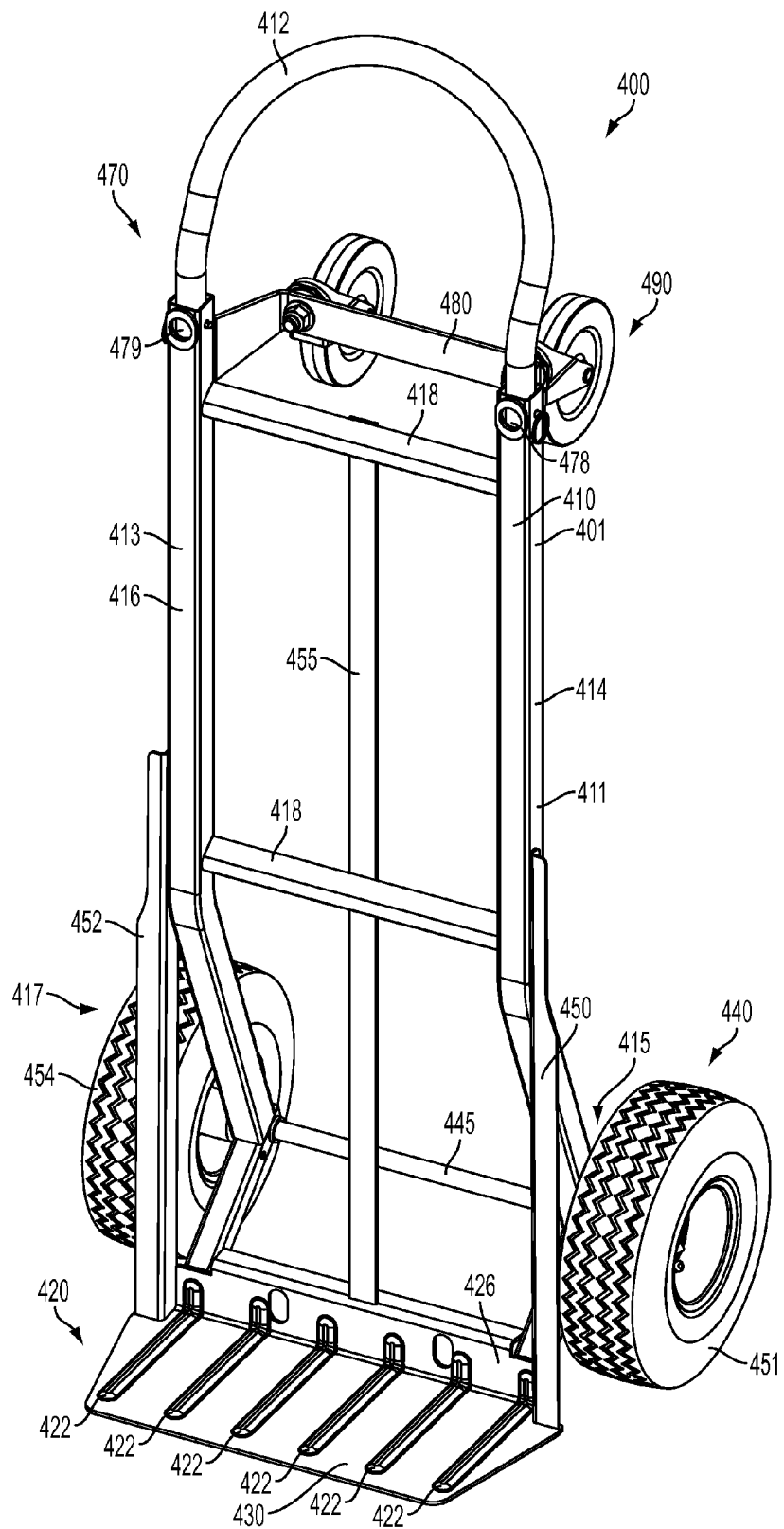
FIG. 20 is a front perspective view of a hand truck body according to yet another embodiment in a first orientation.
Figure 21:
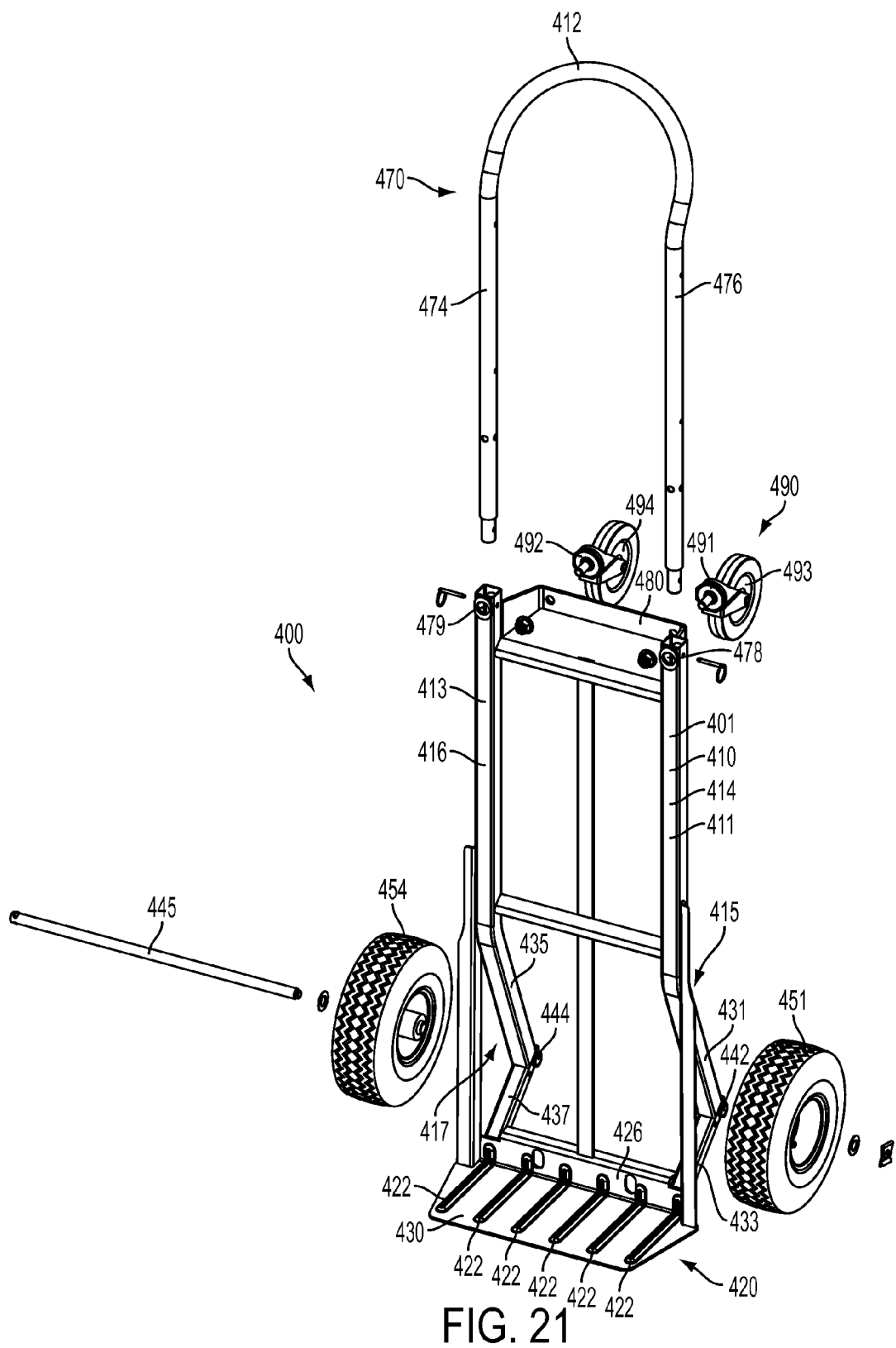
FIG. 21 is an exploded front perspective view of the hand truck of FIG. 20.

A fourth exemplary hand truck 400 is shown in FIGS. 20-25. As may be understood from these figures, the body of this hand truck 400 is, generally speaking, a convertible version of the hand truck body 200 shown in FIG. 7. In this embodiment, the hand truck 400 comprises: (1) a frame 410; (2) an upper handle assembly 470; (3) a nose plate 420; (4) a primary wheel assembly 440 (which is shown in FIG. 21 with the wheel assembly's axle 445 and wheels 451, 454 removed for purposes of clarity); and (5) a secondary wheel assembly 490. These various components are discussed in greater detail below.

Frame

The hand truck 400 may include any suitable type of frame 410. In the embodiment shown in FIGS. 20 and 23, the lower portion of the hand truck's frame 410 is structurally similar to (e.g., identical to) the frame 210 of the embodiment of the hand truck 200 shown in FIG. 7.

Figure 22:
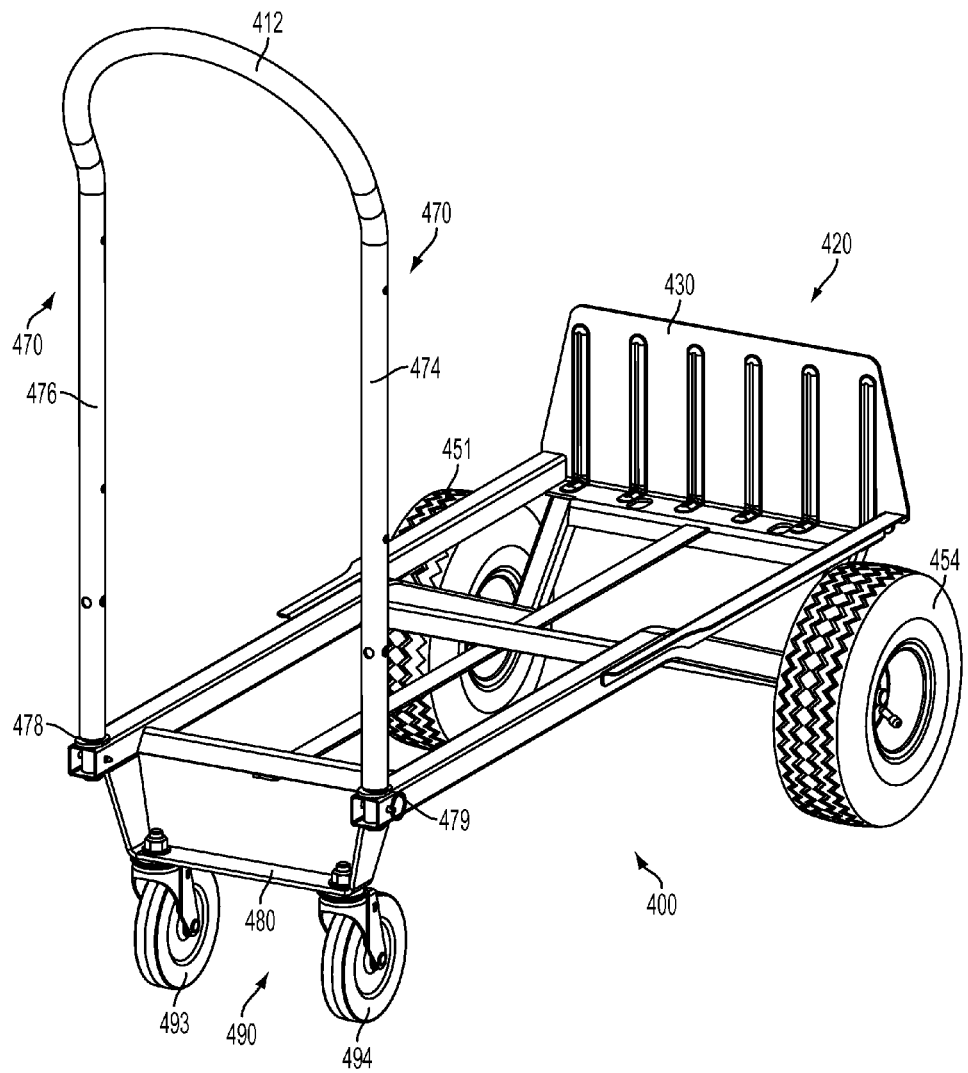
FIG. 22 is a front perspective view of the hand truck of FIG. 20 in a second orientation.
Figure 23:
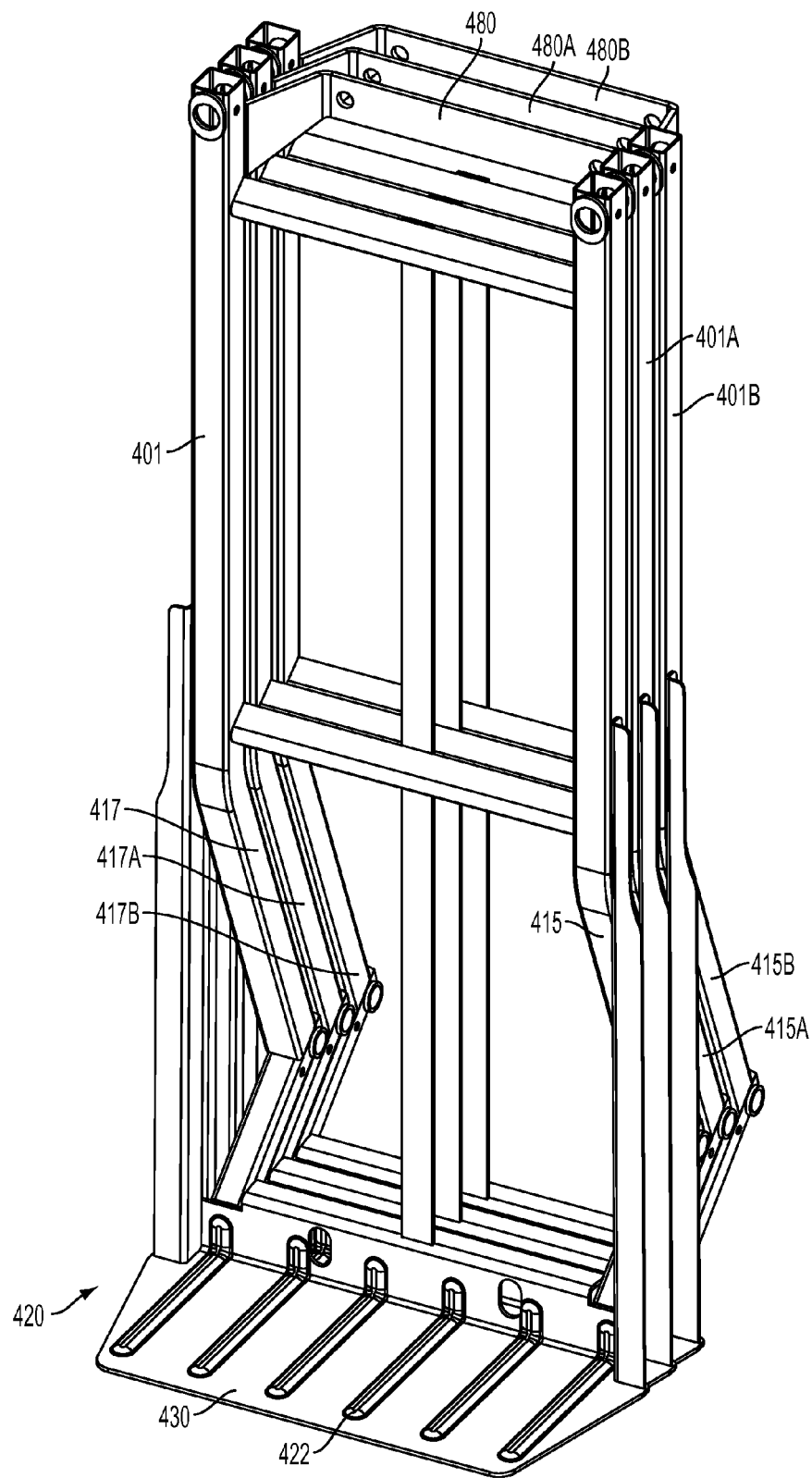
FIG. 23 is a front perspective view of three hand truck bodies having the same structure as the body of the hand truck shown in FIG. 20. This figure shows the three hand truck bodies in a nested, mating configuration.
Figure 24:
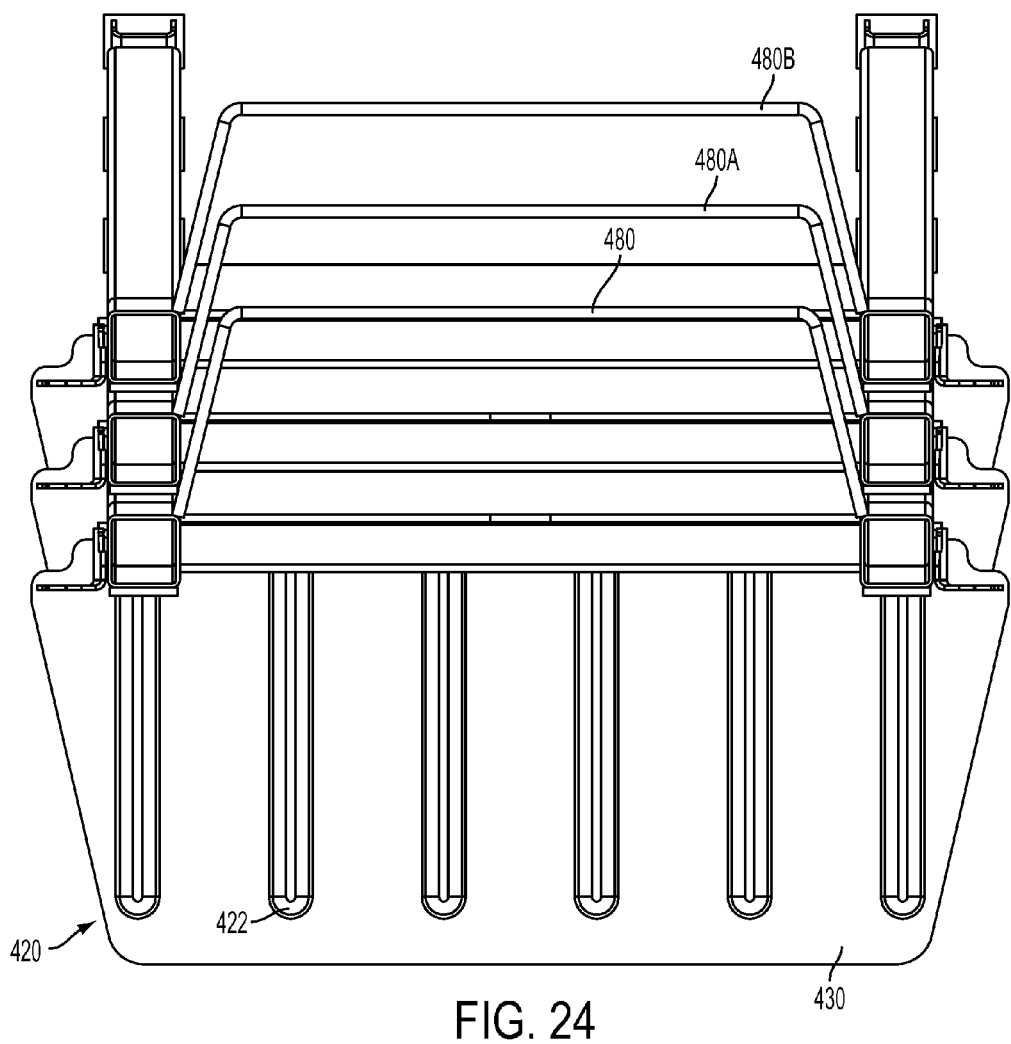
FIG. 24 is a top view of the three hand truck bodies of FIG. 23.
Figure 25:
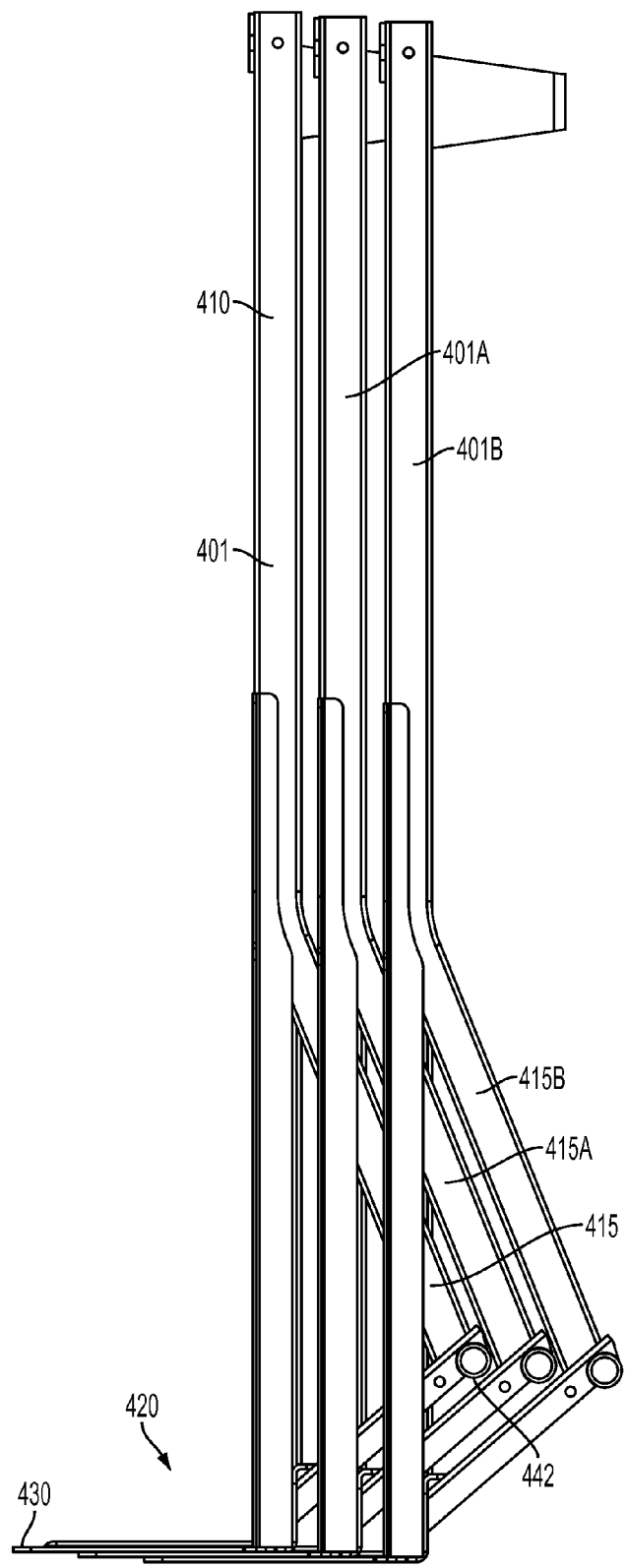
FIG. 25 is a side view of the three hand truck bodies of FIG. 23.

As shown in FIGS. 20-22, the first side frame rail 414, in this embodiment, defines a first handle support 478 adjacent (e.g., to) an upper end of the front face of the first side frame rail 414. In this embodiment, the first handle support 478 is adapted to structurally correspond to the bottom end of the first side handle rail 476 of the upper handle assembly 470. When the hand truck 400 is in horizontal orientation (e.g., a cart orientation), the end of the first side handle rail 476 of the upper handle assembly 470 may be inserted into the first handle support 478 such that the first handle support 478 supports the first side handle rail 476 of the upper handle assembly 470 in a substantially vertical orientation.

As shown in FIGS. 20-22, the second side frame rail 416, in this embodiment, includes a second handle support 479 adjacent (e.g., to) an upper end of the front face of the second side frame rail 416. In this embodiment, the second handle support 479 is adapted to structurally correspond to the bottom end of the second side handle rail 474 of the upper handle assembly 470. When the hand truck 400 is in a horizontal orientation (e.g., a cart orientation), the end of the second side handle rail 474 of the upper handle assembly 470 may be inserted into the second handle support 479 such that the second handle support 479 supports the second side handle rail 474 of the upper handle assembly 470 in a substantially vertical orientation.

The various components of the frame 410 may be made of any suitable (preferably sturdy) material (e.g., a suitable metal such as aluminum, or plastic). These components are secured together using any suitable combination of fasteners or welding techniques to provide a rigid frame for the hand truck 400.

Upper Handle Assembly

The hand truck 400 may include an upper handle assembly 470. As may be understood from FIGS. 20-22, the upper handle assembly 470 is adapted to be selectively moved from: (1) a vertical position when the hand cart 400 is in a substantially vertical position (FIGS. 20-21) to (2) a vertical position (FIG. 22) when the hand truck 400 is in a horizontal position (e.g., a cart orientation). In the embodiment shown in FIG. 21, the upper handle assembly 470 comprises: (1) a first side handle rail 476; (2) a second side handle rail 474; and (3) a U-shaped connector 412.

The first side handle rail 476 may be made of a substantially straight, elongated tube. In the embodiment shown in FIG. 21, the first side handle rail 476 has a substantially circular (e.g., circular) profile. In alternative embodiments, the first side handle rail 476 may comprise a substantially linear (e.g., linear) tube with any other suitable profile (e.g., a square, rectangular, or oval profile). As shown in FIG. 21, the first side handle rail 476 may be adapted to fit and slide within the frame's first side rail 414. In various embodiments, the dimensions of the inner surface of the first side rail 414 correspond to the dimensions of the outer surface of the first side handle rail 476 such that the first side handle rail 476 can nest within the first side rail 414 with sufficient clearance to facilitate smooth sliding and sufficient snugness to provide rigidity of the hand truck 400 when the upper handle assembly 470 is in an expanded configuration.

The second side handle rail 474 may be made of a substantially straight, elongated tube. In the embodiment shown in FIG. 21, the second side handle rail 474 has a substantially circular (e.g., circular) profile. In alternative embodiments, the second side handle rail 474 may comprise a substantially linear (e.g., linear) tube with any other suitable profile (e.g., a square, rectangular, or oval profile). As shown in FIG. 21, the second side handle rail 474 may be adapted to fit and slide within the frame's second side rail 416. In various embodiments, the dimensions of the inner surface of the second side rail 416 correspond to the dimensions of the outer surface of the second side handle rail 474 such that the second side handle rail 474 can nest within the second side rail 416 with sufficient clearance to facilitate smooth sliding and sufficient snugness to provide rigidity of the hand truck 400 when the upper handle assembly 470 is in an expanded configuration.

In a particular embodiment, the U-shaped connector 412 is adapted to connect the top portions of the first side handle rail 476 and the second side handle rail 474. The U-shaped connector 412 may be adapted for use as a handle.

Nose Plate

In the embodiment shown in FIG. 20, the hand truck 400 has a nose plate 420 that is substantially structurally similar (e.g., identical) to the nose plate 220 of the embodiment of the hand truck 200 shown in FIG. 7.

Primary Wheel Assembly

In the embodiment shown in FIG. 20, the hand truck 400 has a primary wheel assembly 440 that is substantially structurally similar to (e.g., identical to) the primary wheel assembly 240 of the embodiment of a hand truck 200 shown in FIG. 7.

Secondary Wheel Assembly

In particular embodiments, the fourth exemplary hand truck 400 may further comprise a secondary wheel assembly 490. In the embodiment shown in FIG. 22, the secondary wheel assembly 490 is adapted for facilitating the movement of the hand truck 400 relative to a support surface while the hand truck 400 is in a horizontal orientation (e.g., the hand truck is being used as a cart). The secondary wheel assembly 490 may be adapted for cooperating with the primary wheel assembly 440 to facilitate rolling movement of the hand truck 400. In various embodiments, the secondary wheel assembly 490 comprises at least one wheel 493, 494 rotatably attached adjacent (e.g., to) the upper end of the frame 410 when the hand truck 400 is in a substantially vertical orientation. In the embodiment shown in FIG. 21, the secondary wheel assembly 490 comprises a first 491 and a second 492 caster, first and second wheels 493, 494 wheels that are each respectively rotatably mounted to one of the casters 491, 492, and a secondary wheel mount 480.

In particular embodiments, the secondary wheel mount 480 is positioned adjacent (e.g., to) the respective upper ends of the first 414 and second 416 side frame rails and may operate as a connecting member. In the embodiment shown in FIG. 21, the secondary wheel mount 480 extends between the respective upper ends of the first 414 and second 416 side frame rails. In this embodiment, the secondary wheel mount 480 extends substantially perpendicularly (e.g., perpendicularly) between the first 414 and second 416 side frame rails toward the rear of the hand cart 400 when the hand cart 400 is in a substantially vertical position.

Nesting Multiple Fourth Exemplary Hand Trucks

In various embodiments, the body 401 of the fourth exemplary hand truck 400 is adapted to nest with hand truck bodies having a structure that is the same or substantially similar to the structure of the fourth exemplary hand truck body 401 (e.g., with "like" hand truck bodies). As may be understood from FIGS. 23-25, the hand truck body 401 is adapted to nest with like hand truck bodies in substantially the same manner that the hand truck body 201 of FIG. 7 is adapted to nest with like hand truck bodies.

FIGS. 22-25 show three like hand truck bodies 401, 401A-401B in a nested, mating relationship. In this embodiment, the hand truck bodies 401, 401A-401B are dimensioned so that, when the hand truck bodies 401, 401A-401B are positioned in a nested, mating relationship, the exterior face of the secondary wheel mount 480 of the front hand truck (e.g., hand truck body 401) at least substantially mates with (e.g., entirely mates with), the interior face of the of the secondary wheel mount 480A of the rear hand truck body (e.g., hand truck body 401A).

Fifth Exemplary Hand Truck

Figure 26:
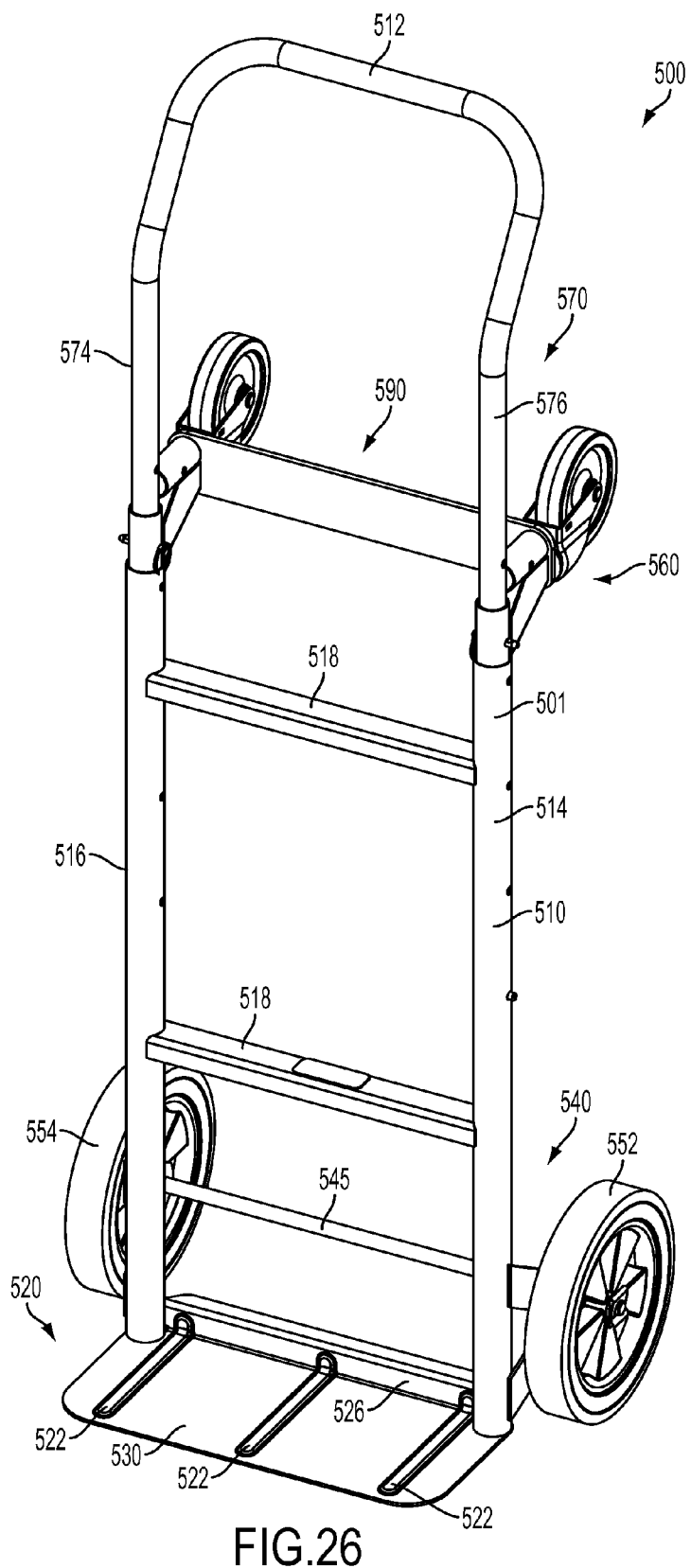
FIG. 26 is a front perspective view of a hand truck according to a second particular embodiment of the invention.
Figure 27:
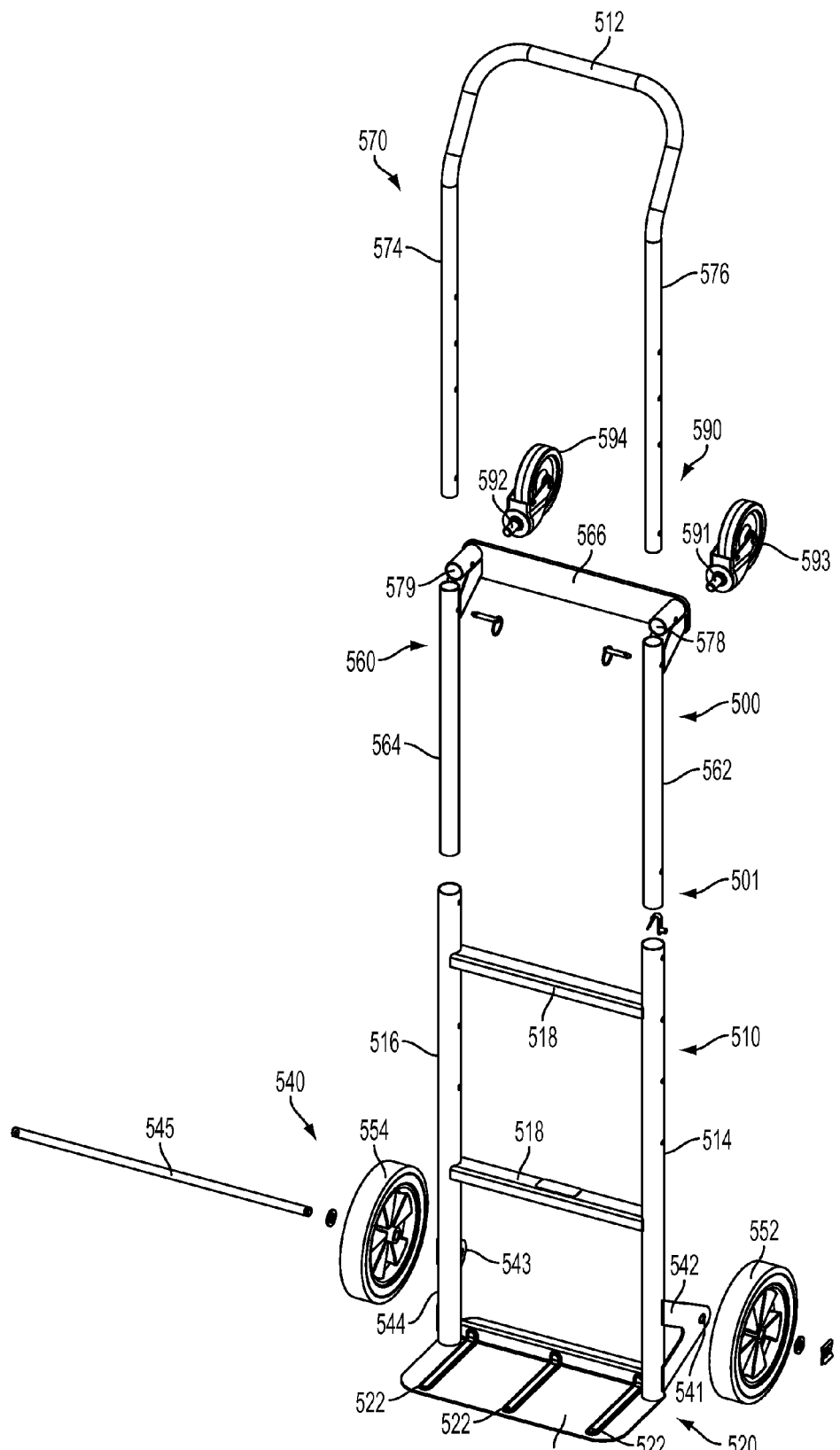
FIG. 27 is a front perspective exploded view of the hand truck of FIG. 26.
Figure 28:
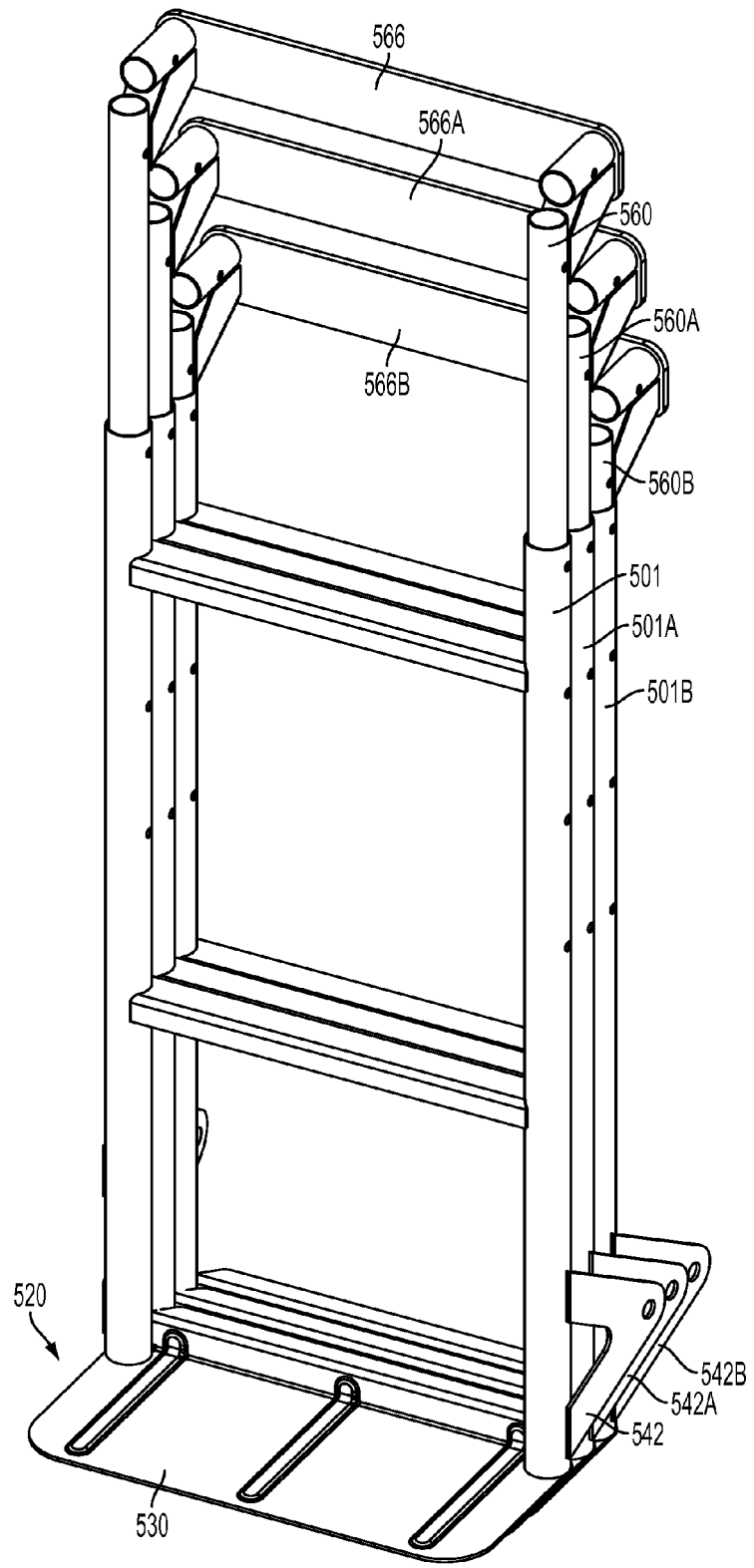
FIG. 28 is a front perspective view of three hand truck bodies having the same structure as the body of the hand truck of FIG. 26. This figure shows the three hand truck bodies in a nested, mating configuration.

A fifth exemplary hand truck 500 is shown in FIGS. 26-28. As may be understood from these figures, the body 501 of this hand truck is, generally speaking, an expandable, convertible version of the hand truck body 101 shown in FIG. 1. The fifth exemplary hand truck 500 is adapted for conversion between: (1) a vertical hand truck orientation and (2) a horizontal hand cart orientation. As shown in FIG. 27, in this embodiment, the hand truck 500 comprises: (1) a primary frame 510; (2) a secondary frame 560; (3) an upper handle assembly 570; (4) a nose plate 520; (5) a primary wheel assembly 540 (which is shown in FIG. 27 with the wheel assembly's axle 545 and wheels 552, 554 removed for purposes of clarity); and (6) a secondary wheel assembly 590. These various components are discussed in greater detail below.

Primary Frame

The hand truck 500 may include any suitable type of primary frame 510. In the embodiment shown in FIG. 26, this primary frame 510 includes: (1) a first side frame rail 514 (which, in this embodiment, is a substantially straight, elongated frame member that is adapted to stand in a substantially vertical orientation when the hand truck 500 is in an upright position); (2) a second side frame rail 516 (which, in this embodiment, is a substantially straight, elongated frame member that is adapted to stand in a substantially vertical orientation when the hand truck 500 is in an upright position); and (3) a plurality of crossbars 518 that extend between, and physically connect, the first and second side frame rails 514, 516.

The various components of the primary frame 510 may be made of any suitable (preferably sturdy) material (e.g., a suitable metal such as aluminum or steel, or plastic). These components are secured together using any suitable combination of fasteners or welding techniques to provide a rigid frame for the hand truck 500.

Secondary Frame

The hand truck 500 may include any suitable type of secondary frame 560. The secondary frame 560 is adapted for facilitating the selective conversion of the hand truck 500 between; (1) a compact configuration and (2) an expanded configuration. In the embodiment shown in FIG. 27, this secondary frame 560 includes: (1) a first side rail 562; (2) a second side rail 564; and (3) a connecting member 566.

The first side rail 562 may be made of a substantially straight, elongated tube. In the embodiment shown in FIG. 27, the first side rail 562 has a substantially circular (e.g., circular) profile. In alternative embodiments, the first side rail 562 may comprise a substantially linear (e.g., linear) tube with any other suitable profile (e.g., a square, rectangular, or oval profile). As shown in FIG. 27, the first side rail 562 may be adapted to fit within the primary frame's 510 first side frame rail 514. As shown in FIG. 27, the first side rail 562 has a cross sectional profile that corresponds to the cross sectional profile of the first side frame rail 514. In various embodiments, the dimensions of the inner surface of the first side frame rail 514 correspond to the dimensions of the outer surface of the first side rail 562 such that the first side rail 562 can nest within the first side frame rail 514 with sufficient clearance to facilitate smooth sliding and sufficient snugness to provide rigidity of the hand truck 500 when in an expanded configuration.

The second side rail 564 may be made of a substantially straight, elongated tube. In the embodiment shown in FIG. 27, the second side rail 564 has a substantially circular (e.g., circular) profile. In alternative embodiments, the second side rail 564 may comprise a substantially linear (e.g., linear) tube with any other suitable profile (e.g., a square, rectangular, or oval profile). As shown in FIG. 27, the second side rail 564 may be adapted to fit and slide within the primary frame's 510 second side frame rail 516. As shown in FIG. 27, the second side rail 564 has a cross sectional profile that corresponds to the cross sectional profile of the second side frame rail 516. In various embodiments, the dimensions of the inner surface of the second side frame rail 516 correspond to the dimensions of the outer surface of the second side rail 564 such that the second side rail 564 can nest within the second side frame rail 516 with sufficient clearance to facilitate smooth sliding and sufficient snugness to provide rigidity of the hand truck 500 when in an expanded configuration.

In particular embodiments, the connecting member 566 is adapted to connect the top portions of the first side rail 562 and the second side rail 564. The connecting member 566 may be made of any suitable (preferably sturdy) material (e.g., a suitable metal such as steel or aluminum, or plastic). The connecting member 566 is adapted to substantially mate with (e.g., entirely mate with) a like connecting member 566 of a like hand truck body 501.

Upper Handle Assembly

The hand truck 500 may include an upper handle assembly 570. As may be understood from FIG. 27, the upper handle assembly 570 is adapted to be selectively moved from: (1) a vertical position when the hand truck 500 is in a substantially vertical position to (2) a vertical position when the hand truck 500 is in a horizontal position (e.g., a cart orientation). In the embodiment shown in FIG. 27, the upper handle assembly 570 comprises: (1) a first side handle rail 576; (2) a second side handle rail 574; (3) an upper connecting member 512; and (4) first 578 and second 579 handle supports.

The first side handle rail 576 may be made of a substantially straight, elongated tube. In the embodiment shown in FIG. 27, the first side handle rail 576 has a substantially circular (e.g., circular) profile. In alternative embodiments, the first side handle rail may comprise a substantially linear (e.g., linear) tube with any other suitable profile (e.g., a square, rectangular, or oval profile). As shown in FIG. 27, the first side handle rail 576 may be adapted to fit and slide within the first side rail 562. As shown in FIG. 27, the first side handle rail 576 has a cross sectional profile that corresponds to the cross sectional profile of the first side rail 562. In various embodiments, the dimensions of the inner surface of the first side rail 562 correspond to the dimensions of the outer surface of the first side handle rail 576 such that the first side handle rail 576 can nest within the first side rail 562 with sufficient clearance to facilitate smooth sliding and sufficient snugness to provide rigidity of the hand truck 500 when the hand truck 500 is in an expanded configuration.

The second side handle rail 574 may be made of a substantially straight, elongated tube. In the embodiment shown in FIG. 27, the second side handle rail 574 has a substantially circular (e.g., circular) profile. In alternative embodiments, the second side handle rail 574 may comprise a substantially linear (e.g., linear) tube with any other suitable profile (e.g., a square, rectangular, or oval profile). As shown in FIG. 27, the second side handle rail 574 may be adapted to fit and slide within the second side rail 564. As shown in FIG. 27, the second side handle rail 574 has a cross sectional profile that corresponds to the cross sectional profile of the second side rail 564. In various embodiments, the dimensions of the inner surface of the second side rail 564 correspond to the dimensions of the outer surface of the second side handle rail 574 such that the second side handle rail 574 can nest within the second side rail 564 with sufficient clearance to facilitate smooth sliding and sufficient snugness to provide rigidity of the hand truck 500 when the hand truck 500 is in an expanded configuration.

The secondary frame assembly 560 may further comprise a first 578 and a second 579 handle support. The first 578 and second 579 handle supports are adapted to receive the respective ends of the first 576 and second 574 side handle rails when the hand truck 500 is in the horizontal, cart orientation. As shown in FIG. 27, the second handle support 579 has a cross sectional profile that corresponds to the cross sectional profile of the second side handle rail 574. Similarly, the first handle support 578 has a cross-sectional profile that corresponds to the cross sectional profile of the first side handle rail 576. The first 578 and second 579 handle supports are adapted to support the upper handle assembly 570 when the hand truck 500 is in the horizontal cart orientation.

In a particular embodiment, the upper connecting member 512 is adapted to connect the top portions of the first side handle rail 576 and the second side handle rail 574. The upper connecting member 512 may be adapted for use as a handle.

Nose Plate

In the embodiment shown in FIG. 26, the hand truck 500 has a nose plate 520 that is structurally similar (e.g., identical) to the nose plate 120 of the first embodiment of the hand truck 100 shown in FIG. 1.

Primary Wheel Assembly

In the embodiment shown in FIG. 26, the hand truck 500 has a primary wheel assembly 540 that is structurally similar (e.g., identical) to the wheel assembly 140 of the first embodiment of the hand truck 100 shown in FIG. 1.

Secondary Wheel Assembly

In particular embodiments, the fifth exemplary hand truck 500 may further comprise a secondary wheel assembly 590. In the embodiment shown in FIG. 27, the secondary wheel assembly 590 is adapted for facilitating the movement of the hand truck 500 relative to the support surface while the hand truck 500 is in a horizontal orientation (e.g., when the hand truck 500 is being used as a cart). The secondary wheel assembly 590 may be adapted for cooperating with the primary wheel assembly 540 to facilitate rolling movement of the hand truck 500. In various embodiments, the secondary wheel assembly 590 comprises at least one wheel that is rotatably attached adjacent the upper end of the hand truck 500 when the hand truck 500 is in a substantially vertical position. In various embodiments, the secondary wheel assembly 590 is attached to the underside of the connecting member 566 when the hand truck 500 is in the horizontal orientation. In the embodiment shown in FIG. 27, the secondary wheel assembly 590 comprises first and second casters 591, 592, and first and second wheels 593, 594 that are each rotatably attached to one of the respective casters 591, 592.

Converting Fifth Exemplary Hand Truck

In various embodiments, the hand truck 500 is adapted for selective conversion between: (1) a vertical operating arrangement and (2) a horizontal operating arrangement. In various embodiments, while in the horizontal position, the hand truck 500 is further adapted for selective conversion between: (1) a compact operating arrangement and (2) an expanded operating arrangement. In alternative embodiments, the hand truck 500 is further adapted for selective conversion between: (1) a compact operating arrangement and (2) an expanded operating arrangement while in the vertical position.

As may be understood from FIG. 27, to convert the hand truck 500 from the vertical operating arrangement to the horizontal operating arrangement, a user may lay the hand truck 500 on the ground so that the primary wheel assembly 540 and secondary wheel assembly 590 are both in contact with a support surface supporting the hand truck 500. Once the hand truck 500 is in the horizontal operating arrangement, the user may remove the upper handle assembly 570 from the secondary frame assembly 560 and insert the first side handle rail 576 into the first handle support 578 and the second side handle rail 574 into the second handle support 579. The user may then selectively reposition the secondary frame assembly 560 relative to the primary frame assembly 510. Sliding the secondary frame 560 relative to the hand truck's base portion allows the user to selectively adjust the hand truck 500 between, for example, a compact operating arrangement and an extended operating arrangement. The secondary frame 560 may be locked in the extended operating arrangement with any suitable locking mechanism (e.g., a pin).

In additional embodiments, the secondary frame 560 may be arranged into its extended arrangement while the hand truck 500 is in its vertical operating arrangement.

Nesting Multiple Fifth Exemplary Hand Truck Bodies

In various embodiments, the body 501 of the fifth exemplary hand 500 truck is adapted to nest with hand truck bodies having a structure that is the same or substantially similar to the structure of the fifth exemplary hand truck body 501 (e.g., with "like hand truck bodies). As may be understood from FIG. 28, the hand truck body 501 is adapted to nest its lower portion with the lower portion of like hand truck bodies in substantially the same manner that the hand truck body 101 of FIG. 1 is adapted to nest its lower portion with the lower portion of like hand truck bodies.

FIG. 28 shows three like hand truck bodies 501, 501A-501B in a nested, mating relationship. As shown in this figure, in this embodiment, the hand truck bodies 501, 501A-501B are dimensioned so that, when the hand truck bodies 501, 501A-501B are positioned in a nested, mating relationship, the secondary frame 560 of the front hand truck body 501 at least substantially mates with (e.g., entirely mates with) the secondary frame 560A of the rear hand truck body 501A when the secondary frame 560 of the front hand truck body 510 is extended so that the bottom of the connecting member 566 is at least positioned above the connecting member 566A of the rear hand truck body 501A to allow the front hand truck body 501 and the rear hand truck body 501A to stand nested in a substantially vertical position. In various embodiments, the bottom of the connecting member 566 of the front hand truck body 501 is extended to substantially the same height as the top of the connecting member 566A of the rear hand truck body 501A.

As shown in FIG. 28, when the fifth exemplary hand truck bodies 501, 501A-B are in a nested, mating relationship, the secondary frames 560, 560A-B are in a stair-stepped relationship with one another. In this stair-stepped relationship: (1) the connecting members 566, 566A are substantially parallel to (e.g., parallel to) one another; and (2) the secondary frames 560 of hand truck bodies 501, 501A-B are locked in positions of progressively increasing lengths.

As may be understood from FIG. 28, the rear-most hand truck body 501B in the nested, mating relationship has a secondary frame 560B that is in the least extended position of the various nested hand truck bodies 501, 501A. The hand truck body 501A immediately in front of the rear-most hand truck body 501B has a secondary frame 560A that is locked at a length of extension sufficiently longer than the length of extension of the rear hand truck body 501B to allow the secondary frame 560A of the hand truck body 501A immediately in front of the rear most hand truck body 501B to nest in a stair-step relationship with the secondary frame 560B of the rearmost hand truck body 501B when both hand truck bodies 501A, 501B are in a substantially vertical orientation.

As may be understood from FIG. 28, the secondary frame 560, 560A-B of each successively nested hand truck body 501, 501A-B is locked in an increasingly extended position. The three nested hand truck bodies 501, 501A-B are all in a substantially vertical orientation. In the nested, mating relationship shown in FIG. 28, the first hand truck body 501B has a secondary frame 560B that is in an unextended position. The second, middle hand truck body 501A has a secondary frame 560 that is extended to a first distance where the secondary frame 560A of the second hand truck body 501A is in a nested, stair-step relationship with the secondary frame 560B of the first hand truck body 501B. In the nested, mating relationship shown in FIG. 28, a third hand truck body 501 is the front hand truck body 501 of three like hand truck bodies 501, 501A-B that are positioned in a nested, mating relationship. The secondary frame 560 of the third hand tuck body 501 is extended to a second distance where the secondary frame 560 of the third hand truck body 501 is in a nested, stair-step relationship with the secondary frame 560A of the second hand truck body 501A.

Sixth Exemplary Hand Truck

Figure 29:
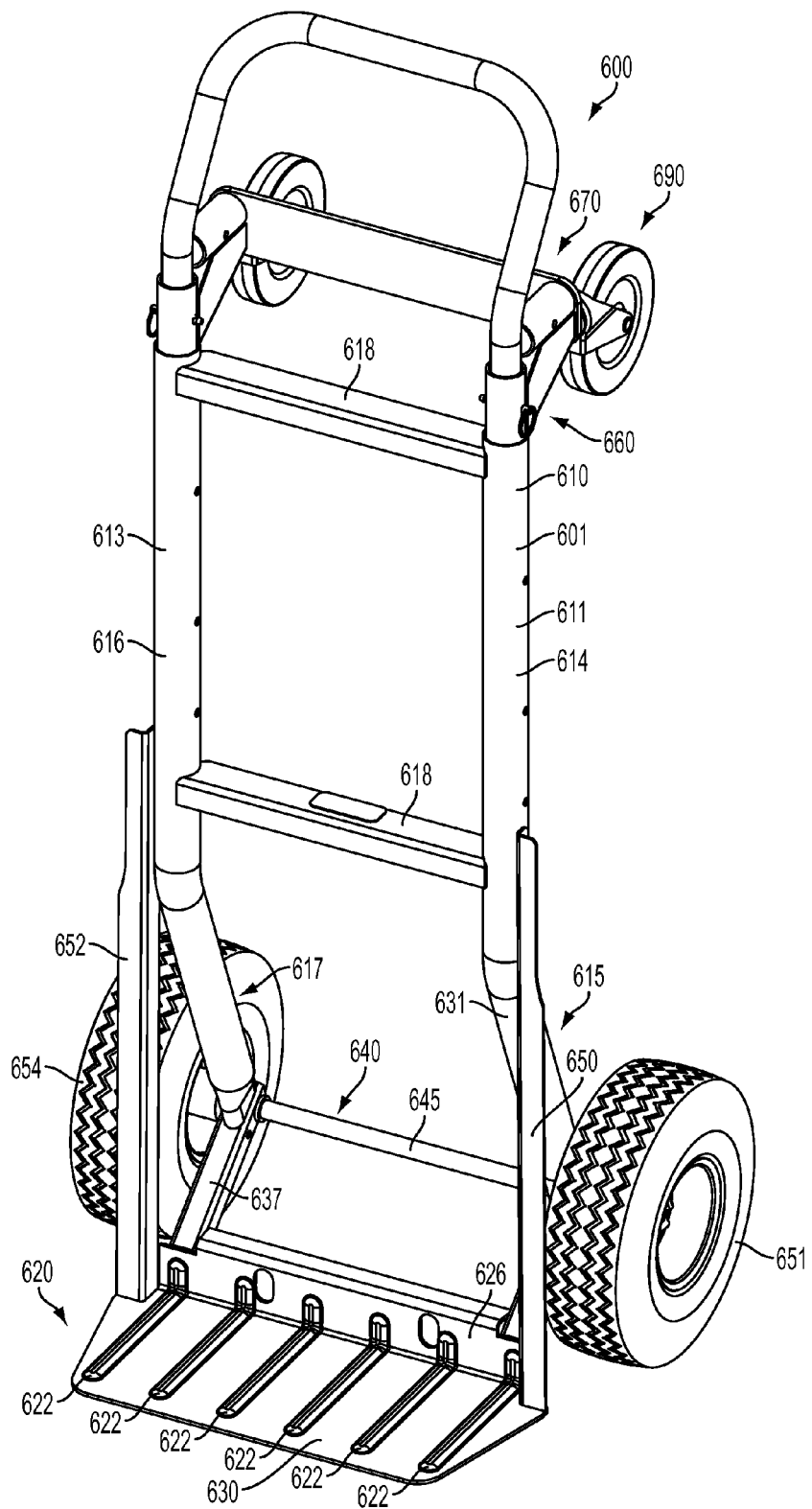
FIG. 29 is a front perspective view of a hand truck body according to yet another embodiment of the invention.
Figure 30:
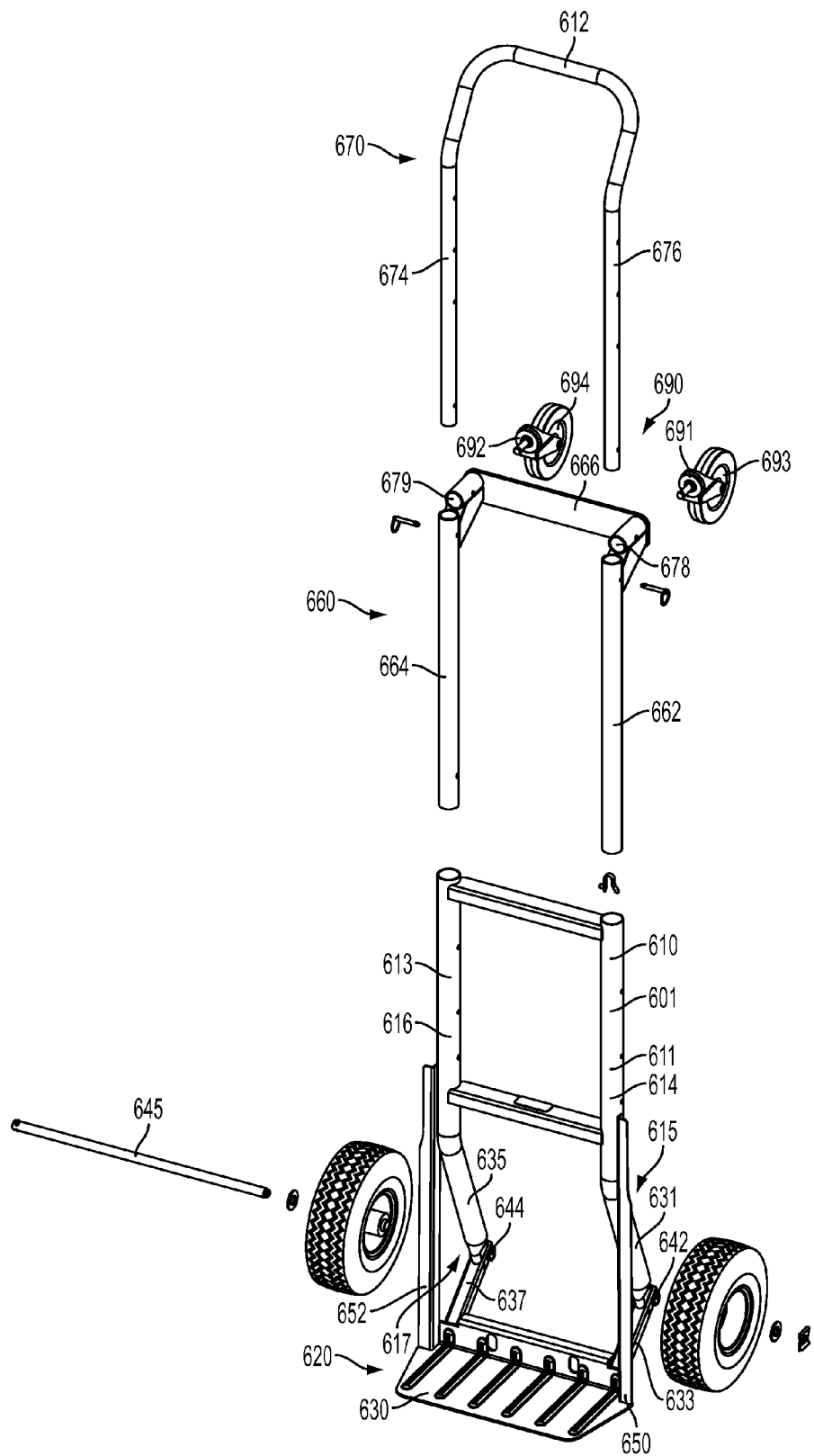
FIG. 30 is an exploded front perspective view of the hand truck body of FIG. 29.
Figure 31:
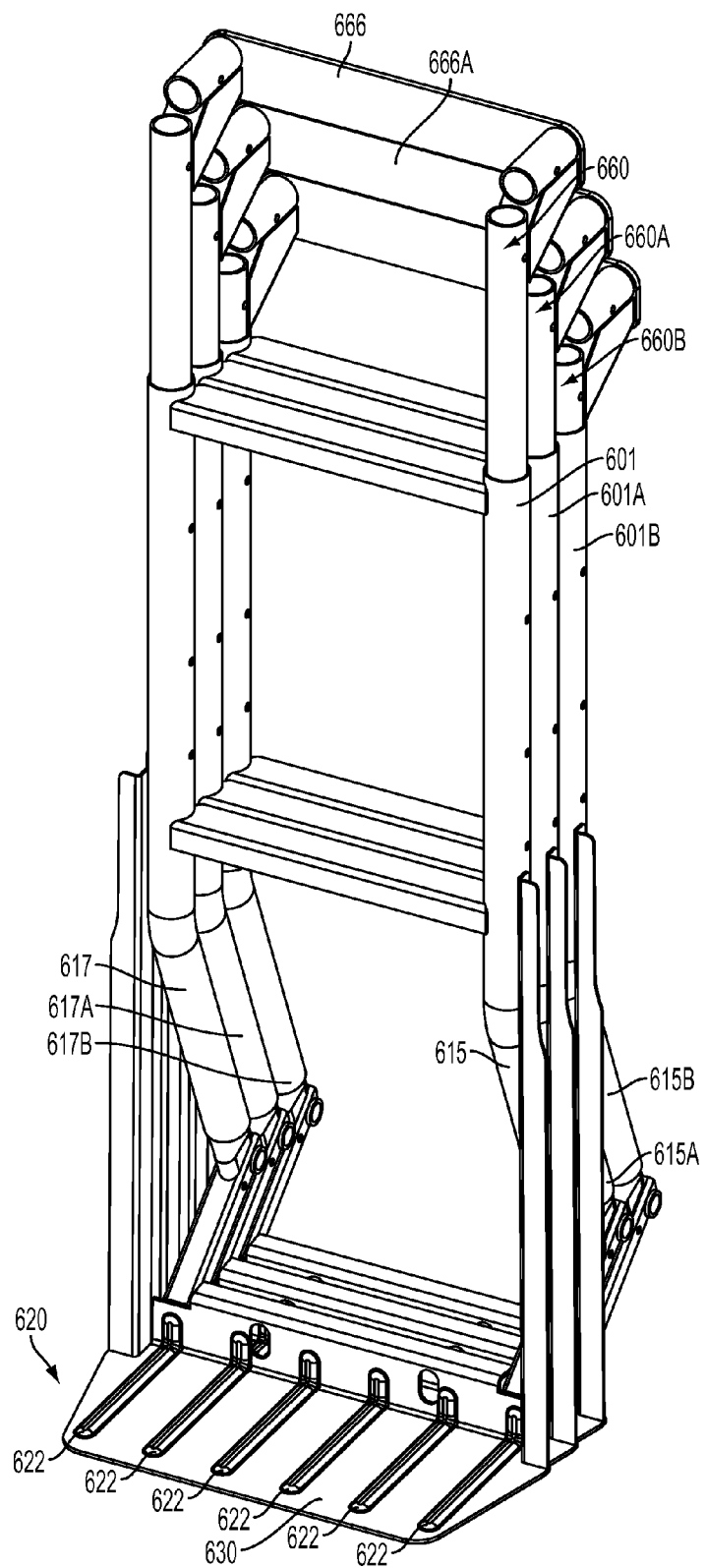
FIG. 31 is a front perspective view of three hand truck bodies having the same structure as the body of the hand truck of FIG. 29. This figure shows the three hand truck bodies in a nested, mating configuration.

An exemplary hand truck according to a further embodiment is shown in FIGS. 29-31. In this embodiment, the hand truck 600 comprises: (1) a primary frame 610; (2) a secondary frame 660; (3) an upper handle assembly 670; (4) a nose plate 620; (5) a primary wheel assembly 640; and (6) a secondary wheel assembly 690. These various components are discussed in greater detail below.

Primary Frame

The hand truck 600 has a primary frame 610 that is structurally similar (e.g., identical) to the frame 210 of the embodiment of a hand truck 200 shown in FIG. 7 without the handle 260 or upper connecting portion 212.

Secondary Frame

The hand truck 600 has a secondary frame 660 that is substantially structurally similar (e.g., identical) to the secondary frame 560 of the embodiment of a hand truck 500 shown in FIG. 27.

Upper Handle Assembly

The hand truck 600 has an upper handle assembly 670 that is substantially structurally similar (e.g., identical) to the upper handle assembly 570 of the embodiment of a hand truck 500 shown in FIG. 27.

Nose Plate

The hand truck 600 has a nose plate 620 that is substantially structurally similar (e.g., identical) to the nose plate 220 of the embodiment of a hand truck 200 shown in FIG. 7.

Primary Wheel Assembly

The hand truck 600 has a primary wheel assembly 640 that is substantially structurally similar (e.g., identical) to the wheel assembly 240 of the embodiment of a hand truck 200 shown in FIG. 7.

Secondary Wheel Assembly

The hand truck 600 has a secondary wheel assembly 690 that is substantially structurally similar (e.g., identical) to the secondary wheel assembly 590 of the embodiment of a hand truck 500 shown in FIG. 27.

Converting Sixth Exemplary Hand Truck

In various embodiments, the hand truck 600 is adapted to be selectively converted between a vertical and a horizontal orientation, and also selectively extended and retracted in the manner described above in regard to the hand truck 500 shown in FIG. 27.

Nesting Multiple Sixth Exemplary Hand Truck Bodies

FIG. 31 shows three like hand truck bodies 601, 601A-601B in a nested, mating relationship. As may be understood from this figure, in this embodiment, the lower portion of the hand truck body 601 is adapted to nest with the lower portion of like hand truck bodies in substantially the same manner that the lower portion of the hand truck body 201 of FIG. 7 is adapted to nest with the lower portion of like hand truck bodies.

Similarly, as shown in FIG. 31, the hand truck bodies 601, 601A-601B are dimensioned so that, when the hand truck bodies 601, 601A-601B are positioned in a nested, mating relationship, the secondary frame 660 of the front hand truck body 601 at least substantially mates with (e.g., entirely mates with) the secondary frame 660A of the rear hand truck body 601A in substantially the same manner that the secondary frame 560 of the hand truck body 501 in FIGS. 26-28 mates with a like secondary frame 560A of a like hand truck body 501A.

Exemplary Hand Truck Shipping Description

As shown in various figures referenced above, when a plurality of hand truck bodies are positioned in a nesting relationship, the hand truck bodies can fit in a compact space. This may, for example, facilitate shipping a large number of the hand truck bodies in a single shipping container.

Figure 34:
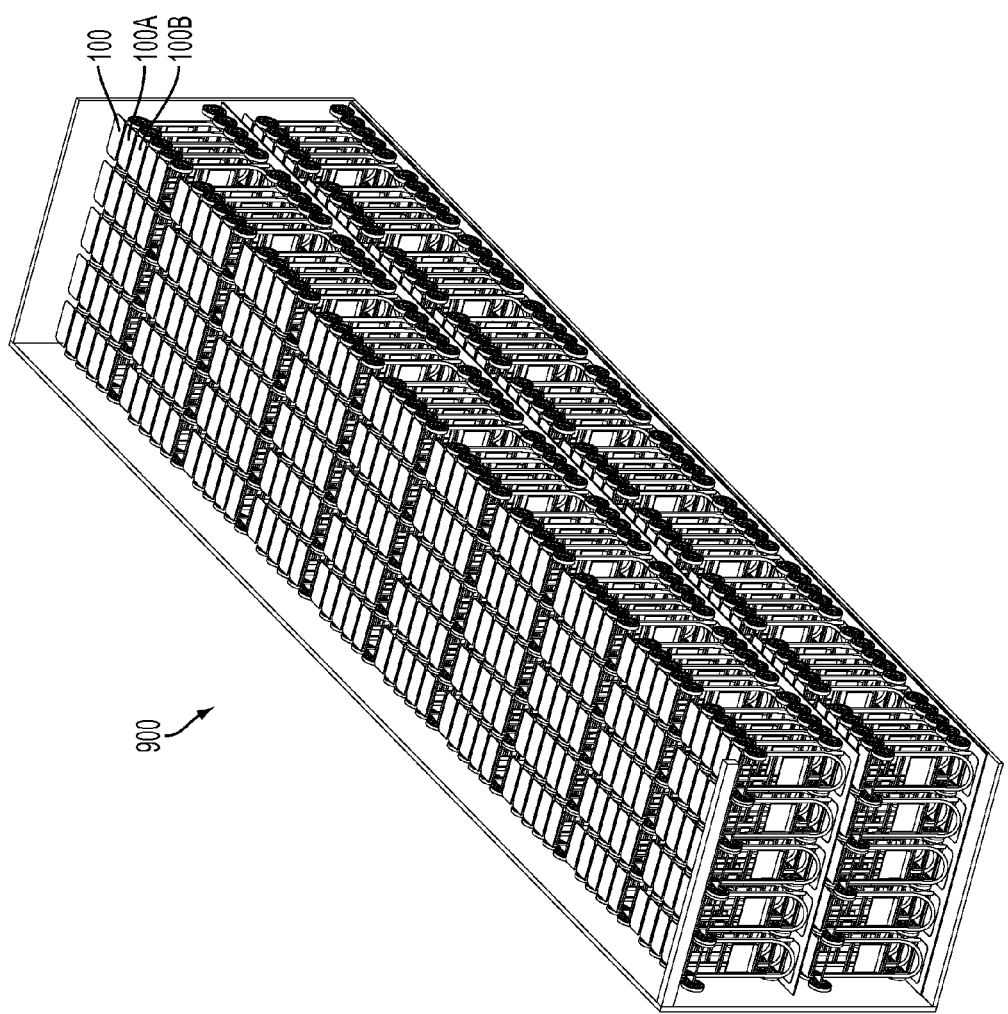
FIG. 34 is a perspective view of a shipping container containing the hand truck bodies of FIG. 1 in a nested, mating configuration.
Figure 35:
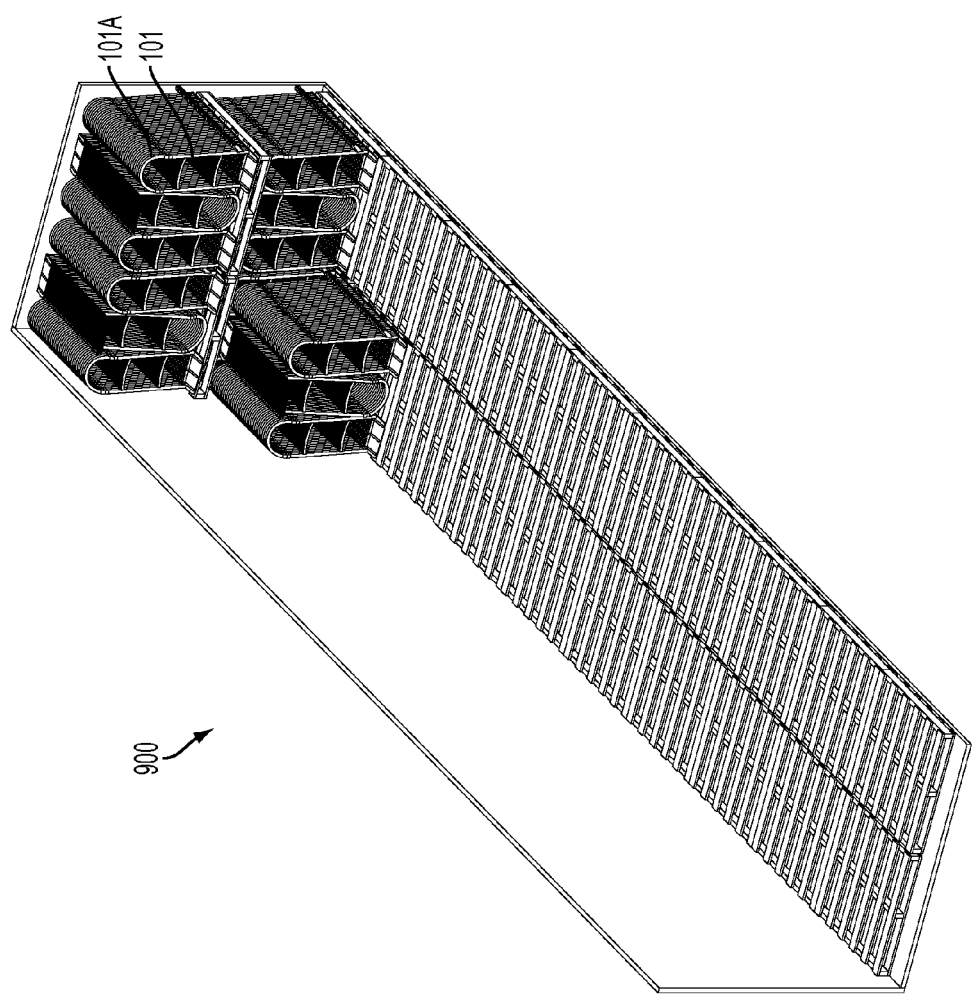
FIG. 35 is a perspective view of a shipping container full of the hand truck bodies of FIG. 1 in a nested, mating configuration.
Figure 36:
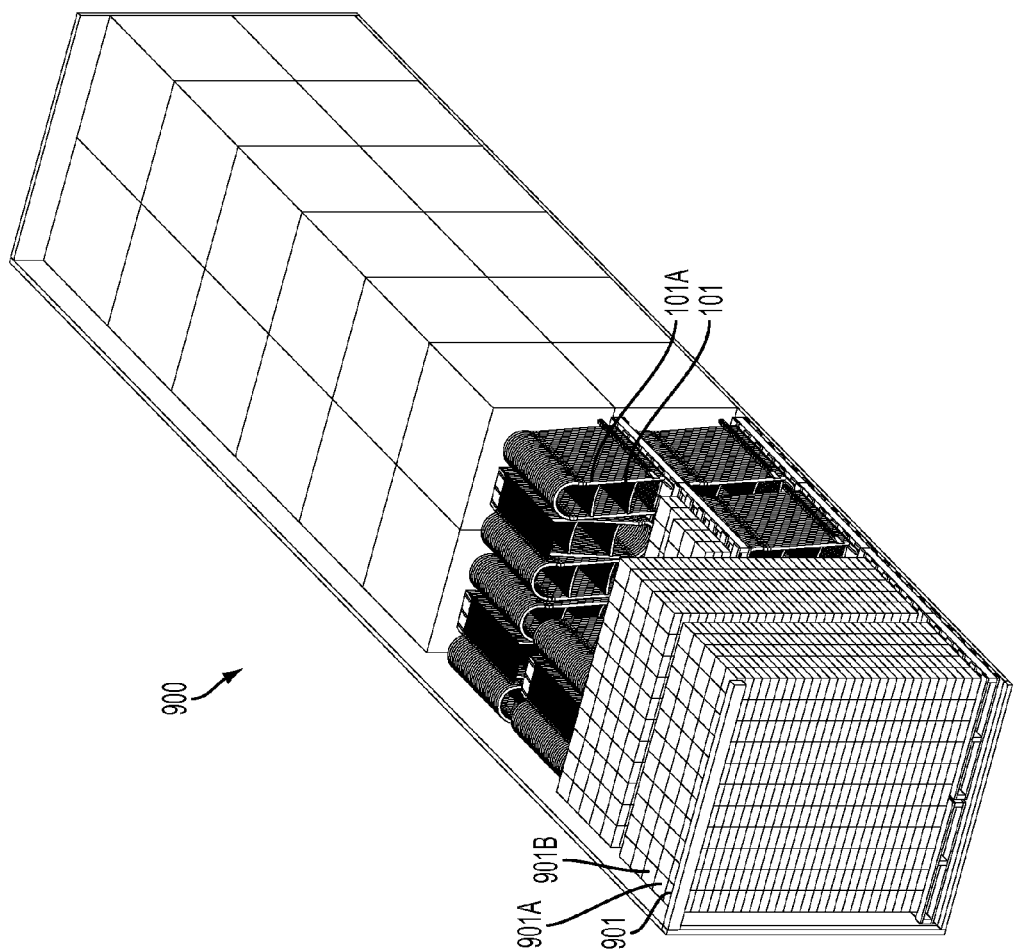
FIG. 36 is a perspective view of a shipping container full of the hand trucks of FIG. 1 in a fully assembled configuration.

FIGS. 34-36 show various hand trucks loaded into a shipping container 900. As may be understood form FIG. 34, a plurality of nested hand trucks 101, 101A can be fit compactly within a shipping container 900. Because hand trucks are in a nested relationship, they may fit in a compact space, allowing efficient shipment of the hand trucks by: (1) placing a plurality of hand truck bodies in a nested relationship; (2) placing the plurality of nested hand truck bodies in a shipping container (such as a freight container or any other suitable container); (3) placing the hand trucks' respective wheels, axles, and handles (if applicable) in the shipping container; (4) transporting the shipping container, which contains the plurality of nested hand truck bodies and their respective wheels, axles, and handles (if applicable) from an origin to a destination; (5) unpacking the shipping container (e.g., at the destination or other suitable location); and (6) assembling the plurality of hand trucks (e.g., at the destination or other suitable location) by moving the hand truck bodies out of the nested relationship (e.g., one at a time) and assembling each respective hand truck body into a completed hand truck by attaching a respective axle and pair of wheels to each respective hand truck body and inserting the upper handle assembly into the secondary frame if applicable.

FIG. 34 shows a plurality of hand truck bodies 101, 101A-B in a nested, mating relationship when the hand truck bodies 101, 101A-B are placed in a shipping container 900. FIG. 35 shows a shipping container 900 packed with the hand truck bodies 101, 101A in nested relationships along with accompanying wheel kits 901, 901A containing wheels and axles. In the shipping container 900 shown in FIG. 35, over 3,000 hand trucks are packed in the container along with their accompanying wheel kits 901, 901A-B. The shipping container 900 in FIG. 36 is packed with fully assembled hand trucks 100, 100A-B. As may be understood from FIG. 36, this shipping container 900 holds many fewer (approximately 1,000) hand trucks than the shipping container 900 of FIG. 35.

Alternative Embodiments

Alternative embodiments of the hand truck 200[1] may comprise components that are, in some respects, similar to the various components described above. Selected distinguishing features of these alternative embodiments are discussed below.

Hand Truck with Interior Vertical Supports

Figure 32:
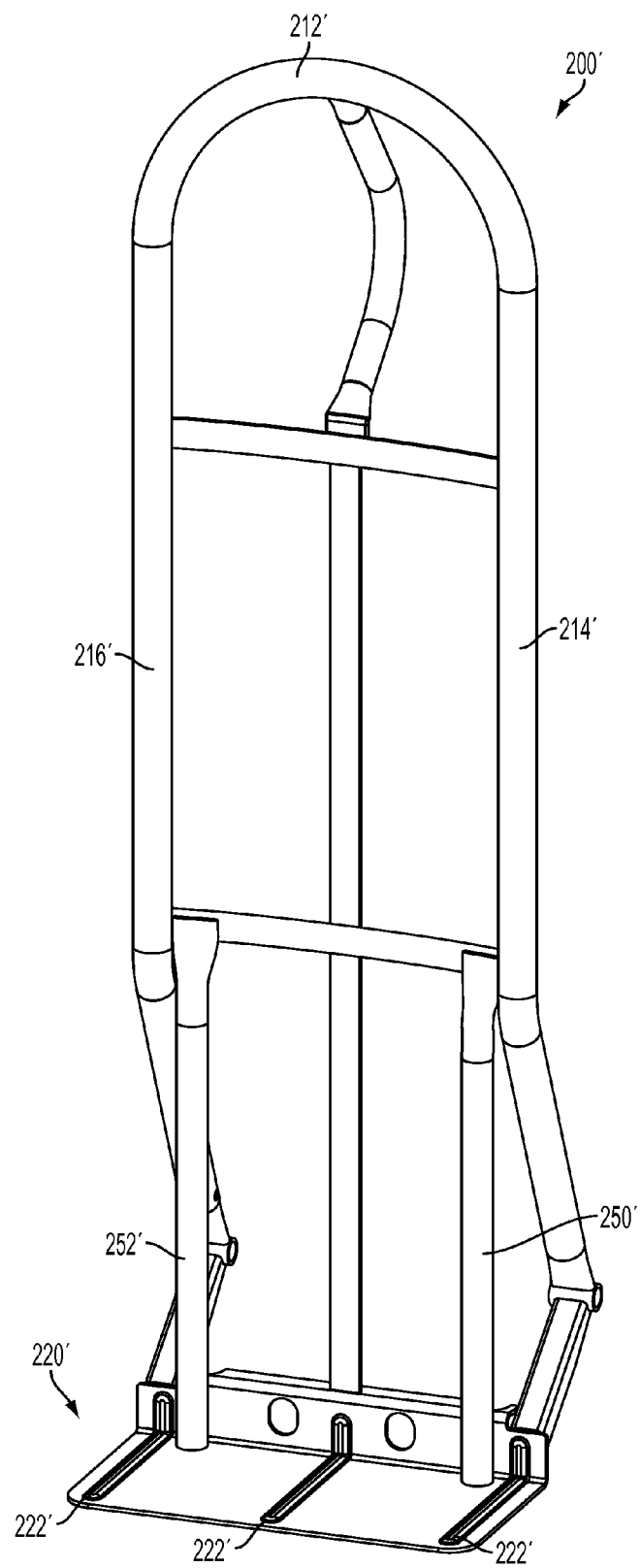
FIG. 32 is a front perspective view of a hand truck body according to a further embodiment of the invention.
Figure 33:
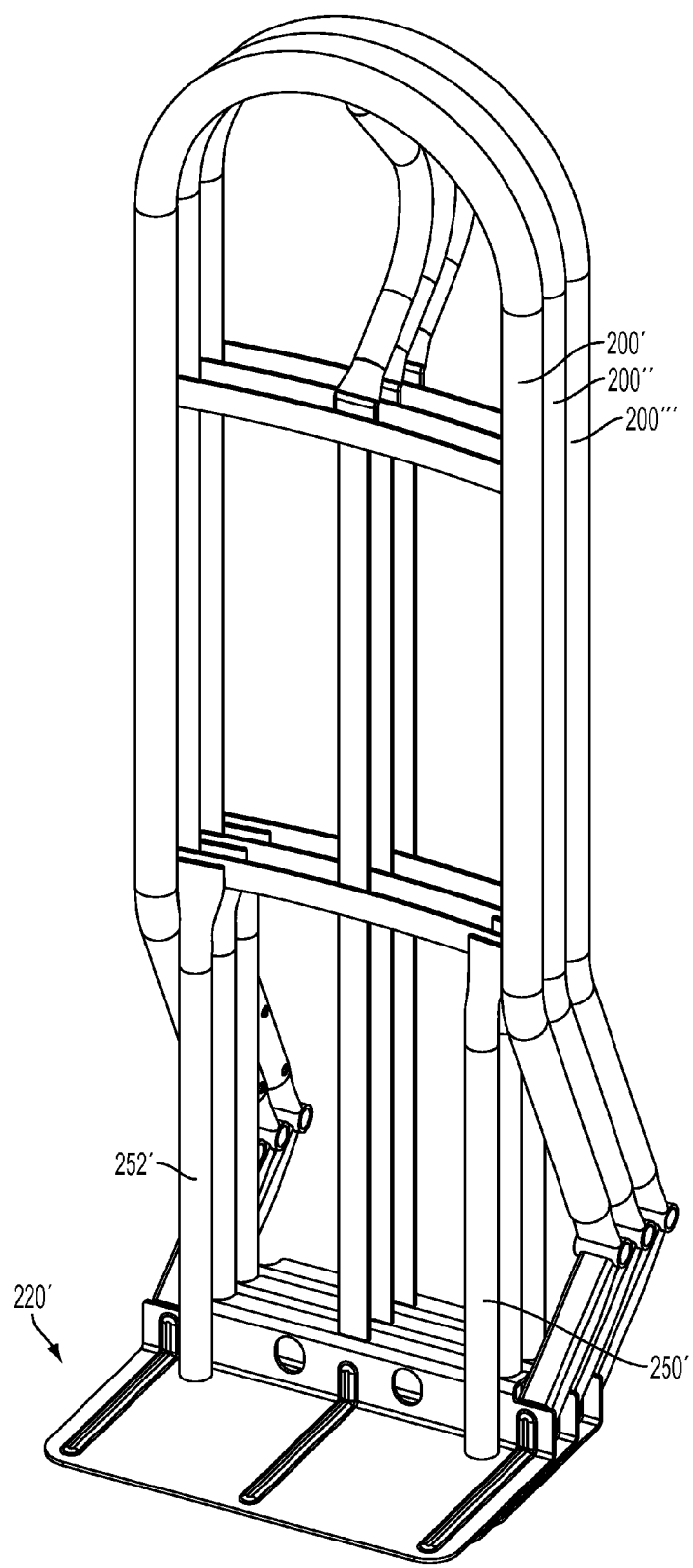
FIG. 33 is a front perspective view of three hand truck bodies having the same structure as the hand truck body of FIG. 32. This figure shows the three hand truck bodies in a nested, mating configuration.

As shown in FIGS. 32-33, particular embodiments of a hand truck may include a second $252^1$ and first $250^1$ interior support. The second interior support $252^1$ may be positioned immediately adjacent the interior lateral side of the first axle support assembly. Similarly, the first interior support $250^1$ may be positioned immediately adjacent the interior lateral side of the second axle support assembly. As shown in FIG. 32, the second $252^1$ and first $250^1$ interior supports extend substantially vertically when the hand truck $200^1$ is in a vertical position. FIG. 33 shows three hand trucks $200^1$, $200^{11}$, and $200^{111}$ with interior vertical supports in a nested, mating relationship.

CONCLUSION

Many modifications and other embodiments of the invention will come to mind to one skilled in the art to which this invention pertains having the benefit of the teachings presented in the foregoing descriptions and the associated drawings. For example, as will be understood by one skilled in the relevant field in light of this disclosure, the invention may take form in a variety of different mechanical and operational configurations. Therefore, it is to be understood that the invention is not to be limited to the specific embodiments disclosed and that modifications and other embodiments are intended to be included within the scope of the appended exemplary concepts. Although specific terms are employed herein, they are used in a generic and descriptive sense only and not for the purposes of limitation.

We claim:

1. A method of storing hand truck frames comprising:
providing a first hand truck frame;
providing a second hand truck frame that is adapted to at least substantially mate with the first hand truck frame;
providing a third hand truck frame that is adapted to at least substantially mate with the second hand truck frame;
placing the first, second, and third hand truck frames into a substantially mating arrangement; and
storing the first, second, and third hand truck frames in the substantially mating arrangement, wherein:
a first angled axle support assembly disposed at a lower portion of the first hand truck frame is adapted to at least substantially mate with a corresponding first angled axle support assembly associated with the second hand truck frame;
a second angled axle support assembly disposed at a lower portion of the first hand truck frame is adapted to at least substantially mate with a corresponding second angled axle support assembly associated with the second hand truck frame; and
the step of placing the first, second, and third hand truck frames into a substantially mating arrangement comprises positioning the first hand truck frame relative to the second hand truck frame so that:
the rearward portion of the first angled axle support assembly associated with the first hand truck frame substantially mates with the corresponding forward portion of the first angled axle support assembly associated with the second hand truck frame; and
the rearward portion of the second angled axle support assembly associated with the first hand truck frame substantially mates with the corresponding forward portion of the second angled axle support assembly associated with the second hand truck frame.

2. A method of storing hand truck frames comprising:
providing a first hand truck frame;
providing a second hand truck frame that is adapted to at least substantially mate with the first hand truck frame;
providing a third hand truck frame that is adapted to at least substantially mate with the second hand truck frame;
placing the first, second, and third hand truck frames into a substantially mating arrangement; and
storing the first, second, and third hand truck frames in the substantially mating arrangement, wherein:
an interior portion of a first axle support associated with the first hand truck frame is adapted to at least substantially mate with a corresponding first axle support associated with the second hand truck frame;
an interior portion of a second axle support associated with the first hand truck frame is adapted to at least substantially mate with a corresponding second axle support associated with the second hand truck frame; and
the step of placing the first, second, and third hand truck frames into a substantially mating arrangement comprises positioning the first hand truck frame relative to the second hand truck frame so that:
the interior portion of the first axle support associated with the first hand truck frame substantially mates with the corresponding first axle support associated with the second hand truck frame; and
the interior portion of a second axle support associated with the first hand truck frame at least substantially mates with the corresponding second axle support associated with the second hand truck frame.

3. The method of claim 1, wherein at least one object is positioned between the first hand truck frame and the second hand truck frame when the first, second, and third hand truck frames are in the substantially mating arrangement.

4. The method of claim 3 wherein the at least one object is selected from a group consisting of:
(a) marketing literature;
(b) a kit that includes one or more hand truck components;
(c) a hand truck wheel; and
(d) a hand truck axle.

5. The method of claim 3, wherein the at least one object is a hand truck wheel.

6. The method of claim 2, wherein at least one object is positioned between the first hand truck frame and the second hand truck frame when the first, second, and third hand truck frames are in the substantially mating arrangement.

7. The method of claim 6, wherein the at least one object is selected from the group consisting of:
(a) marketing literature;
(b) a kit that includes one or more hand truck components;
(c) a hand truck wheel; and
(d) a hand truck axle.

8. The method of claim 6, wherein the at least one object is a hand truck wheel.

9. A method of storing hand truck frames with at least one object positioned between each of the hand truck frames, the method comprising:
providing a first hand truck frame;
providing a second hand truck frame that is adapted to at least substantially nest with the first hand truck frame;
placing the at least one object between the first hand truck frame and the second hand truck frame;

placing the first and second hand truck frames into a substantially nesting arrangement with the at least one object positioned between the first and second hand truck frames; and storing the first and second hand truck frames in the substantially nesting arrangement with the at least one object positioned between the first hand truck frame and the second hand truck frame, wherein:

a first angled axle support assembly disposed at a lower portion of the first hand truck frame is adapted to at least substantially nest with a corresponding first angled axle support assembly associated with the second hand truck frame;

a second angled axle support assembly disposed at a lower portion of the first hand truck frame is adapted to at least substantially nest with a corresponding second angled axle support assembly associated with the second hand truck frame; and the step of placing the first and second hand truck frames into a substantially nesting arrangement with the at least one object positioned between the first and second hand truck frames comprises positioning the first hand truck frame relative to the second hand truck frame so that:

the rearward portion of the first angled axle support assembly associated with the first hand truck frame substantially nests with the corresponding forward portion of the first angled axle support assembly associated with the second hand truck frame; and the rearward portion of the second angled axle support assembly associated with the first hand truck frame substantially nests with the corresponding forward portion of the second angled axle support assembly associated with the second hand truck frame.

10. The method of claim 9, wherein the at least one object is selected from a group consisting of:
(a) marketing literature;
(b) a kit that includes one or more hand truck components;
(c) a hand truck wheel; and
(d) a hand truck axle.

11. A method of storing hand truck frames with at least one object positioned between each of the hand truck frames, the method comprising:
providing a first hand truck frame;
providing a second hand truck frame that is adapted to at least substantially nest with the first hand truck frame;
placing the at least one object between the first hand truck frame and the second hand truck frame;
placing the first and second hand truck frames into a substantially nesting arrangement with the at least one object positioned between the first and second hand truck frames; and
storing the first and second hand truck frames in the substantially nesting arrangement with the at least one object positioned between the first hand truck frame and the second hand truck frame, wherein:
an interior portion of a first axle support associated with the first hand truck frame is adapted to at least substantially nest with a corresponding first axle support associated with the second hand truck frame;
an interior portion of a second axle support associated with the first hand truck frame is adapted to at least substantially nest with a corresponding second axle support associated with the second hand truck frame; and
the step of placing the first and second hand truck frames into a substantially nesting arrangement with the at least one object positioned between the first and second hand truck frames comprises positioning the first hand truck frame relative to the second hand truck frame so that:
the interior portion of the first axle support associated with the first hand truck frame substantially nests with the corresponding first axle support associated with the second hand truck frame; and
the interior portion of a second axle support associated with the first hand truck frame at least substantially nests with the corresponding second axle support associated with the second hand truck frame.

12. The method of claim 11 wherein the at least one object is selected from the group consisting of:
(a) marketing literature;
(b) a kit that includes one or more hand truck components;
(c) a hand truck wheel; and
(d) a hand truck axle.

13. The method of claim 11, wherein the at least one object is a hand truck axle.

\* \* \* \* \*